US012759882B2

(12) United States Patent
Golsharifi et al.

(10) Patent No.: US 12,759,882 B2
(45) Date of Patent: Oct. 13, 2026

(54) SYNTHESIS OF CARBON NANO-ONIONS BY NANODIAMOND ANNEALING AND FUNCTIONALIZATION OF CARBON MATERIALS

(71) Applicant: ATOMIQ INC, Calabasas, CA (US)

(72) Inventors: Nima Golsharifi, London (GB); Suguru Frederick Amakubo, London (GB)

( * ) Notice: Subject to any disclaimer, the term of this patent is extended or adjusted under 35 U.S.C. 154(b) by 354 days.

(21) Appl. No.: 18/015,242

(22) PCT Filed: Jul. 10, 2020

(86) PCT No.: PCT/US2020/041568
§ 371 (c)(1),
(2) Date: Jan. 9, 2023

(87) PCT Pub. No.: WO2022/010488
PCT Pub. Date: Jan. 13, 2022

(65) Prior Publication Data

US 2023/0257270 A1 Aug. 17, 2023

(51) Int. Cl.
*C01B 32/18* (2017.01)
*H01G 11/36* (2013.01)
*H01G 11/52* (2013.01)

(52) U.S. Cl.
CPC ............. *C01B 32/18* (2017.08); *H01G 11/36* (2013.01); *C01P 2002/72* (2013.01); *C01P 2002/82* (2013.01); *C01P 2004/04* (2013.01); *C01P 2006/40* (2013.01); *H01G 11/52* (2013.01)

(58) Field of Classification Search
CPC ......... C01B 32/18; C01B 32/15; C01B 32/16; C01B 32/162; C01B 32/164; C01B 32/166; H01G 11/36
USPC ........................................................ 428/408
See application file for complete search history.

(56) References Cited

U.S. PATENT DOCUMENTS

2006/0241236 A1 10/2006 Kuznetsov et al.
2016/0141114 A1* 5/2016 Shelke .................. H01G 11/36 252/506

FOREIGN PATENT DOCUMENTS

WO 2007022200 A2 2/2007

OTHER PUBLICATIONS

Felten et al. (2014). "Insight into hydrogenation of graphene: Effect of hydrogen plasma chemistry," Applied Physics Letters 105 (183104); 5 pages.
Fu-Dong et al. (2011). "Preparation of Carbon Nano-Onions and Their Application as Anode Materials for Rechargeable Lithium-Ion Batteries," The Journal of Physical Chemistry C 115(18); 8923-8927.
International Search Report and Written Opinion mailed Mar. 30, 2021, directed to International Application No. PCT/US2020/041568; 20 pages.

(Continued)

*Primary Examiner* — Zachary M Davis

(57) ABSTRACT

Disclosed herein are methods of synthesizing carbon nano-onions, their functionalization methods, and their use as electrode material. More specifically, disclosed are methods of converting nanodiamonds into carbon nano-onions, chemical synthesis of carbon nano-onions from reagents, and functionalization using reagents, reactive gases, and photoexcitation. The use of the synthesized and functionalized carbon nano-onions as an electrode by using them as a composite structure is also disclosed.

18 Claims, 13 Drawing Sheets

(56) References Cited

OTHER PUBLICATIONS

Invitation to Pay Additional Fees dated Feb. 9, 2021, directed to International Application No. PCT/US2020/041568; 18 pages.

Paulchamy et al. (2015). "A Simple Approach to Stepwise Synthesis of Graphene Oxide Nanomaterial," Journal of Nanomedicine & Nanotechnology 6(1); 4 pages.

Plonska-Brzezinska et al. (2013). "The Electrochemical Properties of Nanocomposite Films Obtained by Chemical In Situ Polymerization of Aniline and Carbon Nanostructures," ChemPhysChem 14; 116-124.

* cited by examiner

| | Sample | Diameter (nm) | Interlayer spacing (nm) | FWHM (°) | d-spacing (nm) | Crystallite Size (nm) |
|---|---|---|---|---|---|---|
| Conversion NDs to CNOs | NDCNO@1680 Ar | 7.12±1.10 | 0.41±0.06 | 7.32±0.13 | 0.35 | 1.16 |
| | NDCNO@1780 | 5.99±0.80 | 0.35±0.04 | 3.09±0.03 | 0.35 | 2.75 |
| | NDCNO@2500 | 6.79±1.30 | 0.44±0.11 | 1.69±0.05 | 0.35 | 5.04 |
| Functionalization CNOs | NDCNO@1780 $N_2$ Plasma | 7.37±1.20 | 0.45±0.12 | 7.85±0.23 | 0.35 | 1.08 |
| | NDCNO@1780 $NH_3$ UVA | 7.34±1.70 | 0.42±0.07 | 6.46±0.33 | 0.35 | 1.32 |
| | NDCNO@1780 Ozone | 7.54±1.10 | 0.41±0.08 | 14.47±0.20 | 0.35 | 0.59 |

*FIG. 3*

FIG. 4A
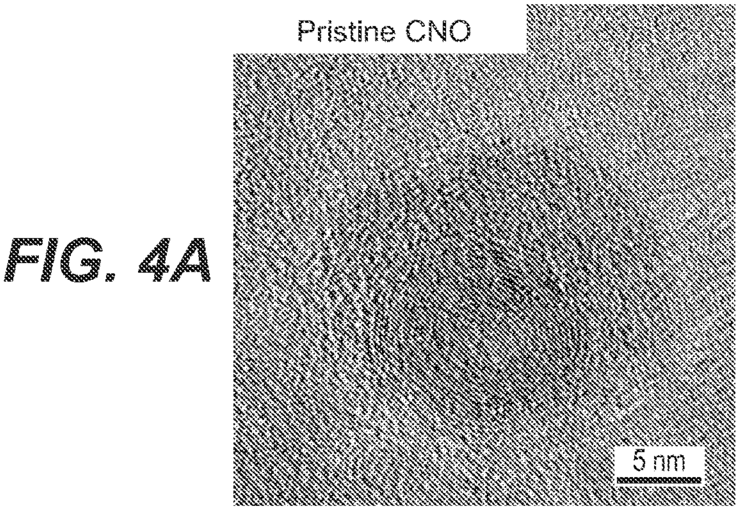
FIG. 4B
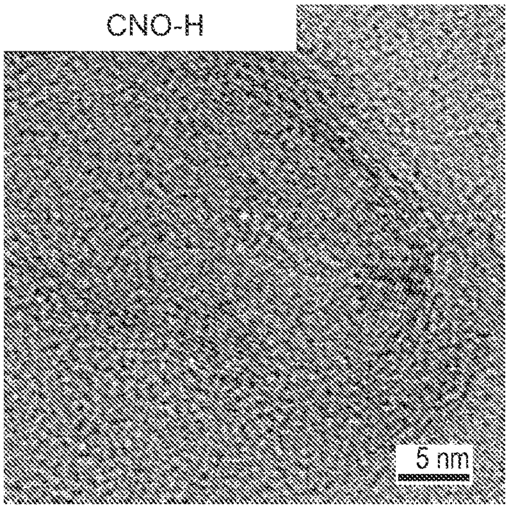
FIG. 4C
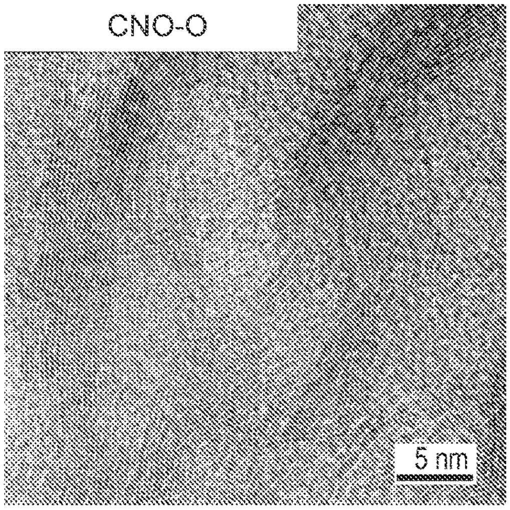
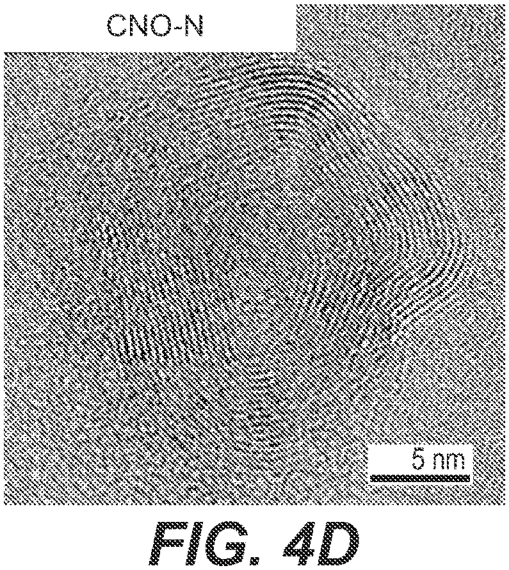
FIG. 4D
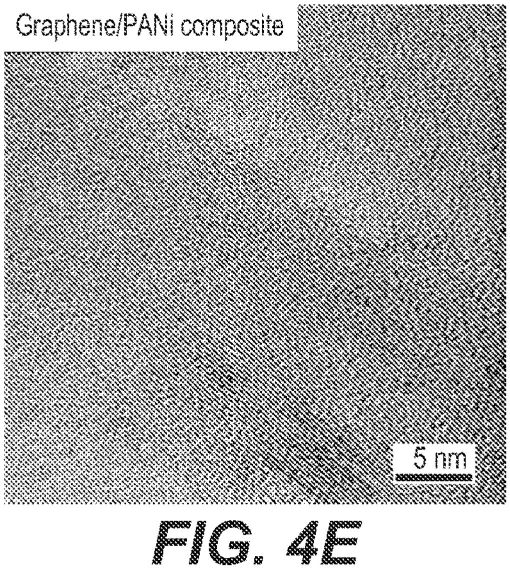
FIG. 4E

| | HRTEM | | Raman | | | | | BET |
|---|---|---|---|---|---|---|---|---|
| Sample | Diameter (nm) | Interlayer spacing (nm) | Pos. D ($cm^{-1}$) | Pos. G ($cm^{-1}$) | $I_D/I_G$ | FWHM D ($cm^{-1}$) | FWHM G ($cm^{-1}$) | Surface area ($m^2g^{-1}$) |
| **CNO** | 6.6±0.1 | 0.4±0.1 | 1358.0±2.0 | 1579.0±1.4 | 1.00±0.04 | 170.0±6.6 | 101.0±4.7 | 436.2±8.3 |
| **CNO-O** | 7.4±0.1 | 0.4±0.1 | 1368.0±1.4 | 1591.0±0.9 | 0.85±0.02 | 149.0 ±4.6 | 91.00±2.7 | 327.5±6.6 |
| **CNO-H** | 15.5±0.7 | 0.4±0.1 | 1377.0±2.1 | 1579.0±1.0 | 0.89±0.02 | 264.0±6.2 | 125.0±3.8 | 529.0±10.6 |
| **CNO-N** | 16.7±0.3 | 0.4±0.1 | 1348.0±0.7 | 1595.0±0.3 | 0.79±0.01 | 224.0±2.5 | 66.0±1.0 | 565.9±11.3 |
| **Graphene/ PANi composite** | - | 0.4±0.1 | - | - | - | - | - | - |

*FIG. 5*

| Sample/Core level | C 1s | Atomic Concentration (% at) O 1s | N 1s | In 3d |
|---|---|---|---|---|
| NDCNO @1680 Ar | 98.68 | 1.25 | - | 0.07 |
| NDCNO @1780 | 93.68 | 3.88 | - | 2.44 |
| NDCNO @2500 | 87.71 | 7.19 | - | 5.10 |
| CNO @1780 $N_2$ Plasma | 96 | 2.54 | 0.46 | 1 |
| CNO @1780 $NH_3$ UVA | 99.01 | 0.76 | 0.22 | - |
| CNO @1780 Ozone | 98.77 | 0.82 | 0.28 | 0.13 |

*FIG. 6*

| Core Level | $NH_3$ UV | | | | | | | | $N_2$ PLASMA | | | | | | | | ANNEALED | | | | | | | OZONE |
|---|---|---|---|---|---|---|---|---|---|---|---|---|---|---|---|---|---|---|---|---|---|---|---|---|
| | $ZnCL_2$ $NH_3$ UV | NaOH $NH_3$ UV | $NA_2CO_3$ $NH_3$ UV | KOH-10M $NH_3$ UV | KOH-7M $NH_3$ UV | KOH-3M $NH_3$ UV | $K_2CO_3$ $NH_3$ UV | $H_3PO_4$ $NH_3$ UV | $ZnCl_2$ $N_2$ PLASMA | NaOH $N_2$ PLASMA | $Na_2CO_3$ $N_2$ PLASMA | KOH-10M $N_2$ PLASMA | KOH-7M $N_2$ PLASMA | KOH-3M $N_2$ PLASMA | $K_2CO_3$ $N_2$ PLASMA | $H_3PO_4$ $N_2$ PLASMA | $ZnCl_2$ ANNEALED | $NA_2CO_3$ ANNEALED | KOH-10M ANNEALED | KOH-7M ANNEALED | KOH-3M ANNEALED | $K_2CO_3$ ANNEALED | $H_3PO_4$ ANNEALED | KOH-3M OZONE |
| C 1 | 83.24 | 98.51 | 98.27 | 87.95 | 97.74 | 93.65 | 98.91 | 88.6 | 86.27 | 91.4 | 94.15 | 64.37 | 79.41 | 88.27 | 96.3 | 77.14 | 91.39 | 98.78 | 97.9 | 92.28 | 96.47 | 98.85 | 91.73 | 90.41 |
| O 1s | 11.33 | 1.12 | 1.49 | 7.29 | 1.48 | 3.93 | 1.09 | 6.84 | 8.75 | 5.37 | 3.91 | 22.78 | 13.37 | 6.43 | 1.13 | 13.85 | 6.15 | 1.07 | 1.43 | 4.55 | 1.88 | 0.93 | 5.74 | 6.65 |
| N 1s | 0.16 | 0.24 | - | 0.15 | 0.57 | 0.48 | - | 0.68 | 1.12 | 0.81 | 0.86 | 1.08 | 1.27 | 2.08 | 2.04 | 0.79 | 0.19 | 0.06 | 0.34 | 0.32 | 0.59 | 0.03 | 0.27 | 0.65 |
| P 2p | | | | | | | | 0.68 | | | | | | | | 2.04 | | | | | | | 0.45 | |
| K 2p | | | | 0.81 | 0.13 | 1.75 | - | | | | | - | - | 0.88 | 0.44 | | | | - | 0.32 | 0.47 | 0.1 | | 0.43 |
| Na 1s | | 0.13 | - | | | | | | | 0.09 | - | | | | | | | 0.09 | | | | | | |
| Cl 2p | 0.13 | | | | | | | | 0.1 | | | | | | | | 0.56 | | | | | | | |
| Zn 2p | 0.02 | | | | | | | | 0.05 | | | | | | | | 0.08 | | | | | | | |
| In 3d | 5.12 | - | 0.24 | 3.81 | 0.09 | 0.19 | - | 3.2 | 3.7 | 2.33 | 1.08 | 11.8 | 5.95 | 2.34 | 0.09 | 6.18 | 1.63 | - | 0.32 | 2.52 | 0.59 | 0.1 | 1.82 | 1.85 |

nb '-' = 'not detected' (i.e. less than 0.1 atomic percent or 1 atom in 1000)
Blank spaces = does not apply. Those elements are not related to the reagent

FIG. 8

| | Charge-discharge & power-energy density | | | Capacitance voltage | | EIS |
|---|---|---|---|---|---|---|
| Sample | Maximum voltage $V^0$cell | Energy density $mWhg^{-1}$ | Power density $mWg^{-1}$ | Specific capacitance ($F\ g^{-1}$) | Electrode weight (mg) | Estimated Resistance ($\times 10^6$ Ohms) |
| **CNO** | 8.86 | 0.01±0.01 | 1.81±0.04 | 30.45 | 4.4 | 2.47 |
| **CNO-O** | 71.25 | 0.77±0.15 | 32.14±0.64 | 48.72 | 6.2 | 6.37 |
| **CNO-H** | 71.22 | 0.442±0.08 | 4.62±0.09 | 25.19 | 6.5 | 42.20 |
| **CNO-N** | 63.33 | 0.62±0.12 | 24.88±0.50 | 54.26 | 5.7 | 7.07 |
| **CNO+PANi** | 25.09 | 0.08±0.02 | 3.51±0.07 | 49.93 | 4.8 | 9.35 |
| **CNO-O+PANi** | 25.86 | 0.09±0.02 | 7.46±0.15 | 51.28 | 5.3 | 4.23 |
| **CNO-H+PANi** | 63.30 | 0.35±0.06 | 61.70±1.03 | 33.27 | 5.2 | 3.75 |
| **CNO-N+PANi** | 215.94 | 7.17±0.14 | 223.74±4.47 | 59.13 | | 10.02 |

*FIG. 9*

SYNTHESIS OF CARBON NANO-ONIONS BY NANODIAMOND ANNEALING AND FUNCTIONALIZATION OF CARBON MATERIALS

CROSS REFERENCE TO RELATED APPLICATIONS

This application is a national stage application under 35 U.S.C. § 371 of International Application No. PCT/US2020/041568, filed internationally on Jul. 10, 2020.

FIELD

This disclosure relates generally to the synthesis of carbon nano-onions. Specifically, this disclosure relates to the synthesis of carbon nano-onions by annealing carbon precursor materials.

BACKGROUND

Spherical carbon nanoparticles such as, but not limited to, carbon nano-onions (CNOs) and Buckminsterfullerene were first discovered in 1985. Spherical carbon nanoparticles are a subset of $sp^2$ carbon materials which also includes closely related materials such as carbon nanotubes (CNTs), graphene, graphene nanoribbon, graphene platelets, carbon pills, and other hybrid $sp^2$ structures. Spherical carbon nanoparticles and other $sp^2$ carbon materials are coveted for their desirable properties and are seen as an excellent and versatile material with a multitude of benefits across a very wide range of arts. Despite this, synthesis of high-quality spherical carbon nanoparticles in bulk is yet to be established presenting a significant issue and a challenge that has resulted in an entry barrier, thereby lowering its adoption rate across the various arts.

Furthermore, the hydrophobic nature of the spherical carbon nanoparticles means that for many of its potential application there is an additional layer of challenges where it may be incompatible either with its operation (such as its lack of compatibility with electrolyte when used as electrodes) or inability to interact with reagents when processed into applications such as biomarkers.

SUMMARY

The limitations and challenges faced by prior attempts in the art are predominantly in the high-quality bulk production and functionalization of Carbon Nano-Onions (CNOs). CNOs are a graphene-like carbon nanomaterial that is known to have a plethora of uses across a wide range of arts with excellent properties. These properties can include high surface areas typically on the order of 30 $m^2/g$ to 500 $m^2/g$, presence of mesopores (typically 2-50 nm) and micropores (typically <2 nm), and higher electrical conductivity (2-4 S/cm) than activated carbon (a commonly used electrode material, 0.93 S/cm). Despite this, CNOs are incredibly underused due to the challenges faced in CNO production.

First, producing CNOs in bulk or on an industrial level can be quite difficult. Electron beam irradiation, for example, is known to produce high-quality CNOs, but of low yield. Second, the CNOs are typically required to be of uniform size for them to be produced market-ready such that when they are further processed down the line the CNOs would be of the same quality. Ion implantations, for example, are known to produce CNOs of a wide range of sizes (typically 30-200 nm). Third, there should be no other form of graphene-like carbon nanomaterial present in the end product. Some production methods, such as pyrolysis, are known to produce non-CNO by-products as well as CNOs, thereby requiring an additional step to separate the CNOs from non-CNO by-products before the CNOs can be used as raw materials. Lastly, many of the synthesis methods known in the art currently rely on catalytic precursors (such as but not limited to Fe, Ni, Mo, MgO, and Co) for the CNOs to grow on resulting in the presence of impurities at the center of CNOs that can affect the yield and in some cases the properties of the CNOs produced when compared to carbon starting material synthesized CNOs.

Besides bulk production, other key challenges faced by those in the art are the functionalization of carbon materials such as CNOs. In many cases, CNOs can be hydrophobic and therefore considered difficult to process. Alternatively, CNOs can be difficult to use in or as an electrode material due to the lack of compatibility with electrolytes. One potential solution to these problems can be to functionalize the CNOs and/or other related carbon materials. This functionalization can make the carbon materials hydrophilic and/or soluble with typical common reagents. Unfortunately, many common functionalization methods are considered expensive or require a tedious multi-step process.

In some embodiments, CNOs can be used in or as an electrode material for, but not limited to, supercapacitors, electric double-layer capacitors, and/or ultracapacitors. Supercapacitors are a device that can store a charge that is used similarly to capacitors and batteries with a wide range of applications across many arts. Their recent development in the art, however, has faced challenges in its electrode improvement where the base material is expected to be confined to a thickness typically of about 50 μm whilst maximizing its surface area to increase its power density and energy density which has proven challenging in the art, presenting a problem in progress.

The following references, which are hereby incorporated by reference in their entirety, provide examples of known CNO synthesis methods and functionalization methods of carbon materials:

Cabioc'h, T., Jaouen, M., Thune, E., Guerin, P., Fayoux, C. and Denanot, M. F., 2000. Carbon onions formation by high-dose carbon ion implantation into copper and silver. Surface and Coatings Technology, 128, pp. 43-50.

Meng, L., Fu, C. and Lu, Q., 2009. Advanced technology for functionalization of carbon nanotubes. Progress in Natural Science, 19(7), pp. 801-810.

Mortazavi, S. Z., Reyhani, A. and Mirershadi, S., 2017. Hydrogen storage properties of multi-walled carbon nanotubes and carbon nano-onions grown on single and bi-catalysts including Fe, Mo, Co and Ni supported by MgO. International Journal of Hydrogen Energy, 42(39), pp. 24885-24896.

Plonska-Brzezinska, M. E. and Echegoyen, L., 2013. Carbon nano-onions for supercapacitor electrodes: recent developments and applications. Journal of Materials Chemistry A, 1(44), pp. 13703-13714.

Applicants have discovered various new ways of producing CNOs. In some embodiments, at least two of the new synthesis methods can use nanodiamond (ND) as a starting material and at least one more can be reagent based. The ND based CNO production methods can use the carbon present in the NDs and can convert the $sp^3$ carbon bonds present in the NDs into $sp^2$ carbon bonds that can constitute CNOs. The reagent-based synthesis methods can use the carbon present in the reagent and convert them into CNOs.

In addition, the applicants have found several new ways of functionalizing carbon materials with many possible functional groups. In some embodiments, the functionalization methods include using at least one of plasma, reagents, reactive gas exposure, and photo-assisted functionalization. The functional groups can include at least one of hydrogen, nitrogen, oxygen, ozone, and amine.

In addition, the applicants have found an electrode material that can include carbon material (e.g., CNOs) and polyaniline-carbon (PANI-carbon) composite that has an enhanced power density of about 1.81-223.74 $mWg^{-1}$ and an energy density of about 0.01-7.17 $mWhg^{-}$. This value can represent about 78.2% improvement over supercapacitors with electrodes made of CNOs with no functionalization.

In some embodiments, a method of forming carbon nano-onions includes adding at least one carbon material to a vessel and annealing the at least one carbon material in the vessel at a temperature of 1000-4000° C. for 1 min to 24 hours. In some embodiments, the method includes wrapping the at least one carbon material in a sheet of graphitic material. In some embodiments, the sheet of graphitic material comprises at least one graphitic material of up to 5 mm in thickness. In some embodiments, the at least one carbon material comprises nanodiamond, diamondoid, single-crystal diamond, polycrystalline diamond, diamond-like carbon, sintered diamond, amorphous diamond, diamond powder, and doped variants thereof. In some embodiments, the at least one carbon material is of natural, artificial, or derivative origin. In some embodiments, the vessel comprises at least one inert gas. In some embodiments, the at least one inert gas comprises nitrogen, carbon dioxide, argon, helium, neon, krypton, xenon, and/or radon. In some embodiments, annealing occurs at a pressure of $10^{-2}$-$10^{-7}$ Pa or $10^{-1}$-$10^{-7}$ mBar. In some embodiments, the temperature is 1000-2000° C. In some embodiments, annealing occurs at an average heating rate of 1° C.-50° C. $min^{-1}$.

In some embodiments, a method of forming carbon nano-onions includes mixing copper chloride hydrate and calcium carbide in a vessel; annealing the mixture in the vessel at a temperature of 1-1500° C. for 1 min to 24 hr to form a product; cooling the annealed product to ambient temperature; filtering the annealed product with at least one filtering agent; rinsing the filtered product with at least one rinsing agent; and heating the rinsed product at a temperature of 1-200° C. for 1 min to 24 hr. In some embodiments, a mixing ratio of copper chloride hydrate to calcium carbide is between 2:1 to 4:1. In some embodiments, the cooling comprises at least one of natural cooling, running coolants, cooling bath, heatsink, and airflow cooling. In some embodiments, the at least one filtering agent comprises ammonia and carbon tetrachloride. In some embodiments, a mixing ratio of ammonia to carbon tetrachloride is between 4:1 to 15:1. In some embodiments, the at least one rinsing agent comprises hydrochloric acid and de-ionized water. In some embodiments, a mixing ratio of hydrochloric acid to de-ionized water is 1:4.

In some embodiments, a method of nitrogen or hydrogen functionalizing carbon materials includes: adding at least one carbon material to a plasma chamber; heating the at least one carbon material in the plasma chamber at a temperature of 50-400° C. and a pressure of 100-10,000 Pa in the presence of nitrogen gas or hydrogen gas for 1 min to 12 hr; exposing the at least one carbon material to plasma in the plasma chamber for 1 min to 6 hr; and cooling the at least one carbon material to ambient temperature. In some embodiments, the cooling comprises at least one of natural cooling, running coolants, cooling bath, heatsink, and airflow cooling. In some embodiments, the at least one carbon material comprises nanodiamonds, diamondoids, single-crystal diamonds, polycrystalline diamonds, diamond-like carbons, sintered diamonds, amorphous diamonds, diamond powders, and doped variants thereof. In some embodiments, the at least one carbon material comprises carbon nano-onions, carbon nanotube, Buckminsterfullerene, graphene, graphene nanoribbon, graphene platelets, carbon pills, hybrid $sp^2$ structures, $sp^2$ fragments, and their functionalized, single-layered and multi-layered variants thereof. In some embodiments, the at least one carbon material is of natural, artificial, or derivative origin. In some embodiments, the nitrogen or hydrogen has a flow rate of 5-100 SCCM in the plasma chamber.

In some embodiments, a method of oxygen functionalizing carbon materials includes: heating at least one carbon material in an oxidizing solution comprising sulfuric acid, nitric acid, and ammonium persulfate at a temperature of 75-125° C.; cooling the at least one carbon material in the oxidizing solution to a temperature of 30-70° C.; filtering the at least one carbon material out of the oxidizing solution; and drying the at least one carbon material. In some embodiments, the oxidizing solution comprises 30-35 g of ammonium persulfate. In some embodiments, the oxidizing solution comprises equal parts of sulfuric acid and nitric acid by volume. In some embodiments, the cooling comprises at least one of natural cooling, running coolants, cooling bath, heatsink, and airflow cooling. In some embodiments, the method includes rinsing of the at least one carbon material in the oxidizing solution with at least one rinsing agent. In some embodiments, the at least one rinsing agent comprises deionized water. In some embodiments, the drying comprises at least one of atmospheric drying, heating, vacuum drying, and airflow drying. In some embodiments, the at least one carbon material comprises nanodiamonds, diamondoids, single-crystal diamonds, polycrystalline diamonds, diamond-like carbons, sintered diamonds, amorphous diamonds, diamond powders, and doped variants thereof. In some embodiments, the at least one carbon material comprises carbon nano-onions, carbon nanotube, Buckminsterfullerene, graphene, graphene nanoribbon, graphene platelets, carbon pills, hybrid $sp^2$ structures, $sp^2$ fragments, and their functionalized, single-layered and multi-layered variants thereof. In some embodiments, the at least one carbon material is of natural, artificial, or derivative origin.

In some embodiments, a method of ozone functionalizing carbon materials includes: adding at least one carbon material to an ozone chamber; heating the at least one carbon material in the ozone chamber at a temperature of 50-400° C. and a pressure of $10^{-1}$-$10^{-7}$ mBar for 1 min to 12 hr; exposing the at least one carbon material to ozone; and cooling the at least one carbon material to ambient temperature. In some embodiments, the ozone has a flow rate of up to 10.0 g/h in the ozone chamber. In some embodiments, the ozone exposure time comprises between about 1 min to about 6 hr. In some embodiments, the cooling comprises at least one of natural cooling, running coolants, cooling bath, heatsink, and airflow cooling. In some embodiments, the at least one carbon material comprises nanodiamonds, diamondoids, single-crystal diamonds, polycrystalline diamonds, diamond-like carbons, sintered diamonds, amorphous diamonds, diamond powders, and doped variants thereof. In some embodiments, the at least one carbon material comprises carbon nano-onions, carbon nanotube, Buckminsterfullerene, graphene, graphene nanoribbon, graphene platelets, carbon pills, hybrid $sp^2$ structures, $sp^2$ fragments, and their functionalized, single-layered and multi-layered variants thereof. In some embodiments, the at least one carbon material is of natural, artificial, or derivative origin.

In some embodiments, a method of amine functionalizing carbon materials includes: adding at least one carbon material to an ultraviolet chamber having a pressure of 100-5000 Pa; and exposing the at least one carbon material to ultraviolet light in the presence of ammonia gas in the ultraviolet chamber for 1 min to 12 hr. In some embodiments, the ammonia gas has a flow rate of 5-100 SCCM in the ultraviolet chamber. In some embodiments, the at least one carbon material comprises nanodiamonds, diamondoids, single-crystal diamonds, polycrystalline diamonds, diamond-like carbons, sintered diamonds, amorphous diamonds, diamond powders, and doped variants thereof. In some embodiments, the at least one carbon material comprises carbon nano-onions, carbon nanotube, Buckminsterfullerene, graphene, graphene nanoribbon, graphene platelets, carbon pills, hybrid $sp^2$ structures, $sp^2$ fragments, and their functionalized, single-layered and multi-layered variants thereof. In some embodiments, the at least one carbon material is of natural, artificial, or derivative origin.

In some embodiments, a method of forming a polyaniline/carbon composite includes: mixing aniline monomer, ethanol, and hydrochloric acid to form a first suspension; adding at least one carbon material to the solution to form a second suspension; ultrasonicating the second suspension for 1 min to 6 hr; cooling the suspension while stirring the suspension to a temperature of −10°-15° C.; adding a mixture comprising ammonium persulfate and hydrochloric acid to the second suspension to form a third suspension comprising a polyaniline/carbon composite while maintaining the temperature of the third suspension to be −10° C.-15° C.; stirring the third suspension for 1 hr to 72 hr; filtering of the polyaniline/carbon composite out of the third suspension; and drying the polyaniline/carbon composite. In some embodiments, the first suspension comprises 0.25 M aniline monomer, 10 ml of 95% ethanol, and 30 ml of 1 M hydrochloric acid. In some embodiments, adding the at least one carbon material to the first suspension comprises adding 10 mg of at least one carbon material to 135 ml of the solution. In some embodiments, the second suspension is ultrasonicated at 40 kHz. In some embodiments, stirring comprises at least one of hand-stirring, automatic stirring, magnetic stirring, ultrasonication, and shear mixing. In some embodiments, the mixture comprises 2.5 g ammonium persulfate and 40 ml of 1 M hydrochloric acid. In some embodiments, the method includes washing the third suspension with ethanol and deionized water. In some embodiments, the cooling comprises at least one of natural cooling, running coolants, cooling bath, heatsink, and airflow cooling. In some embodiments, the drying comprises at least one of atmospheric drying, heating, vacuum drying, and airflow drying. In some embodiments, the at least one carbon material comprises nanodiamonds, diamondoids, single-crystal diamonds, polycrystalline diamonds, diamond-like carbons, sintered diamonds, amorphous diamonds, diamond powders, and doped variants thereof. In some embodiments, the at least one carbon material comprises carbon nano-onions, carbon nanotube, Buckminsterfullerene, graphene, graphene nanoribbon, graphene platelets, carbon pills, hybrid $sp^2$ structures, $sp^2$ fragments, and their functionalized, single-layered and multi-layered variants thereof. In some embodiments, the at least one carbon material is of natural, artificial, or derivative origin.

In some embodiments, an electrode includes: a polyaniline/carbon composite formed by any of the methods disclosed above; and at least one carbon material. In some embodiments, the polyaniline/carbon composite has the at least one carbon material overlaid on top of the polyaniline/carbon composite. In some embodiments, the at least one carbon material is carbon nano-onion formed by any one of methods disclosed above. In some embodiments, the at least one carbon material is a functionalized carbon material according to any of the functionalization methods disclosed above.

In some embodiments, a supercapacitor includes: a first contact layer; a first carbon nano-onion electrode layer on a side of the first contact layer; an electrolyte layer on a side of the first carbon nano-onion electrode layer opposite the first contact layer, the electrolyte layer comprising an electrolyte and a separator comprising polyethylene; a second carbon nano-onion electrode layer on a side of the electrolyte layer opposite the first carbon nano-onion electrode layer; and a second contact layer on a side of the second carbon nano-onion electrode layer opposite the electrolyte layer. In some embodiments, the supercapacitor includes a first polyaniline/carbon composite layer between the first contact layer and the first carbon nano-onion electrode layer and a second polyaniline/carbon composite layer between the second contact layer and the second carbon nano-onion electrode layer. In some embodiments, the first contact and second contact layers comprise graphene and copper. In some embodiments, the first and second carbon nano-onion electrode layers comprise carbon nano-onion formed by any of the methods disclosed above. In some embodiments, the first and second polyaniline/carbon composite layer comprises polyaniline/carbon composite formed by any of the methods disclosed above. In some embodiments, the carbon nano-onion is a functionalized according to any of the functionalization methods disclosed above.

Additional advantages will be readily apparent to those skilled in the art from the following detailed description. The examples and descriptions herein are to be regarded as illustrative in nature and not restrictive.

All publications, including patent documents, scientific articles and databases, referred to in this application are incorporated by reference in their entirety for all purposes to the same extent as if each individual publication were individually incorporated by reference. If a definition set forth herein is contrary to or otherwise inconsistent with a definition set forth in the patents, applications, published applications and other publications that are herein incorporated by reference, the definition set forth herein prevails over the definition that is incorporated herein by reference.

BRIEF DESCRIPTION OF THE DRAWINGS

An exemplary embodiment of the present invention is illustrated by way of example in the accompanying drawings. The drawings show:

FIG. 3 is a table of average diameter and X-Ray Diffraction (XRD) interlayer spacing (d-space) between CNO samples based on 30 randomly selected CNOs from HRTEM images per sample and Full-Width Half Maxima (FWHM), d-space, and crystallite size based XRD in accordance with some embodiments disclosed herein.

FIG. 4 is the HRTEM images of (A) pristine CNOs, (B) CNO-H, (C) CNO-O, (D) CNO-N, and (E) Graphene/Polyaniline composite synthesized using the chemical synthesis methods in accordance with some embodiments disclosed herein.

FIG. 5 is a table of physical parameters from HRTEM, Raman, and BET characterization of the CNOs made using the chemical synthesis method in accordance with some embodiments disclosed herein.

FIG. 6 is a table of atomic percentages (% at) for the CNOs synthesized in accordance with some embodiments disclosed herein and their functionalized variants.

FIG. 8 is a table of elemental quantification of CNO samples activated with 6 different reagents and further physical activation using UV, or Plasma, Annealing, or Ozone in accordance with some embodiments disclosed herein.

FIG. 9 is a table of values from the electrochemical characterization of CNO and CNO+PANI-graphene supercapacitors: Charge-discharge & power-energy density, capacitance-voltage, and electrochemical impedance spectroscopy (EIS) in accordance with some embodiments disclosed herein.

DETAILED DESCRIPTION

Figure 1:
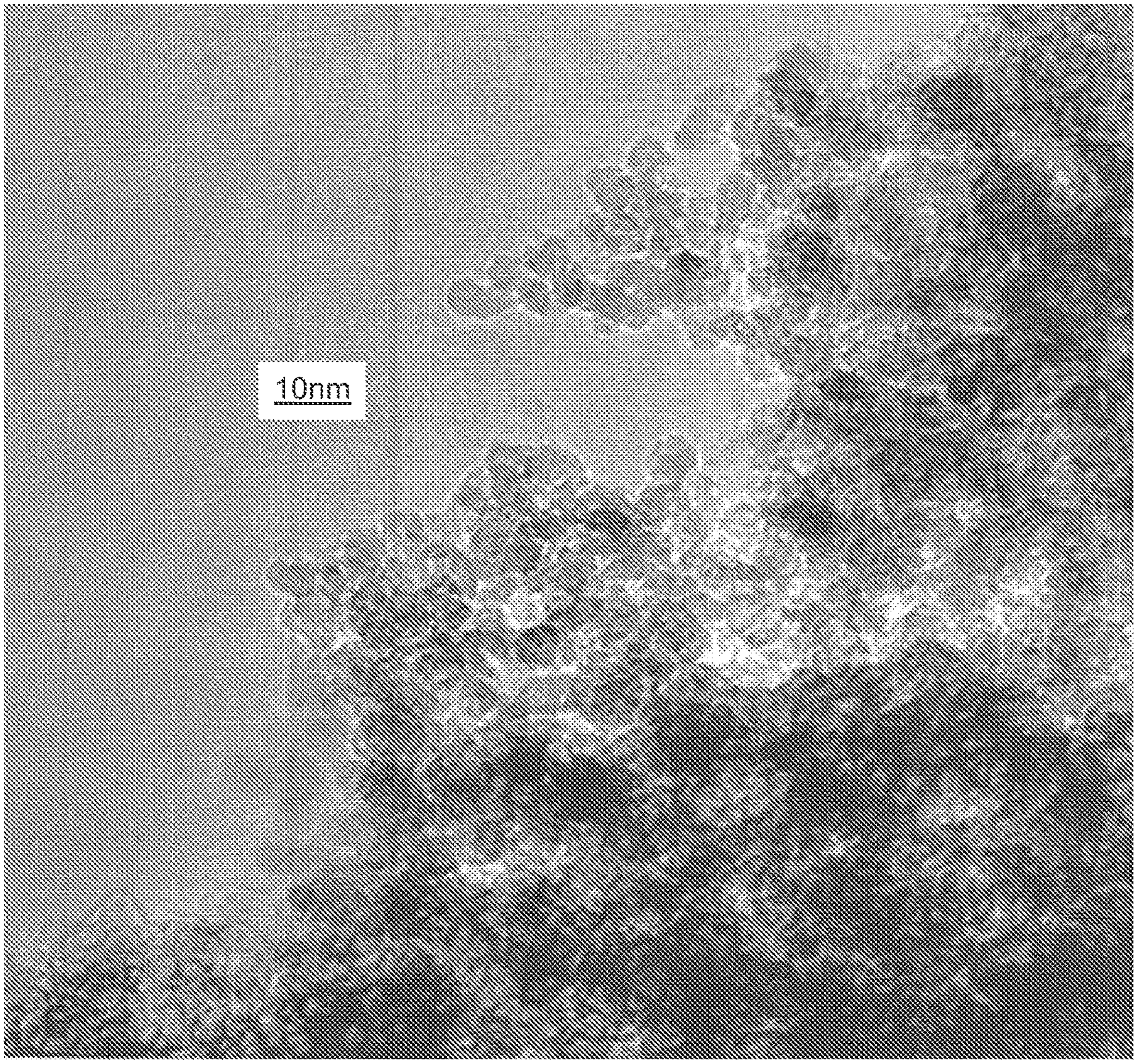
FIG. 1 is a Transmission Electron Microscopy (TEM) image of the nanodiamonds from NanoAmando© in accordance with some embodiments disclosed herein.
Figure 2C:
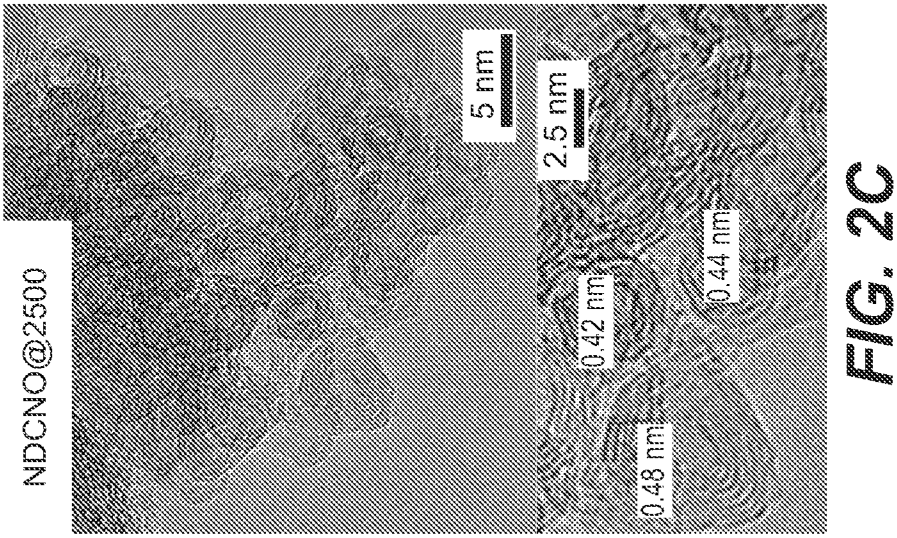
FIG. 2 is a High resolution (HR) TEM images showing pure CNOs produced using the ND based methods in accordance with some embodiments disclosed herein. The alphabetical annotations refer to ones produced using the two ND based methods (A, B and C) and the others are their functionalized variants (D, E, and F): (A) NDCNO@1680 Argon; (B) NDCNO@1780; (C) NDCNO@2500; (D) NDCNO@1780 $N_2$ Plasma; (E) NDCNO@1780 $NH_3$ UVA; and (F) NDCNO@1780 Ozone.
Figure 2B:
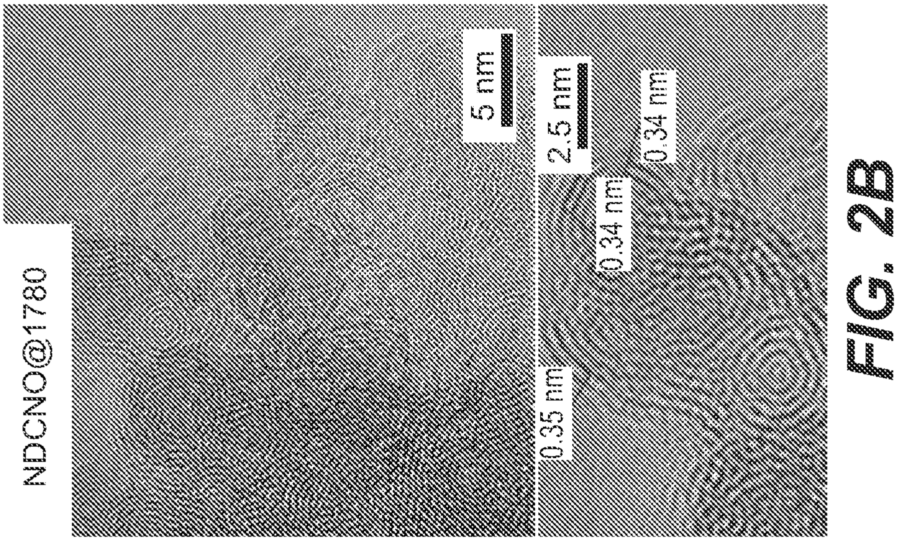
Figure 2A:
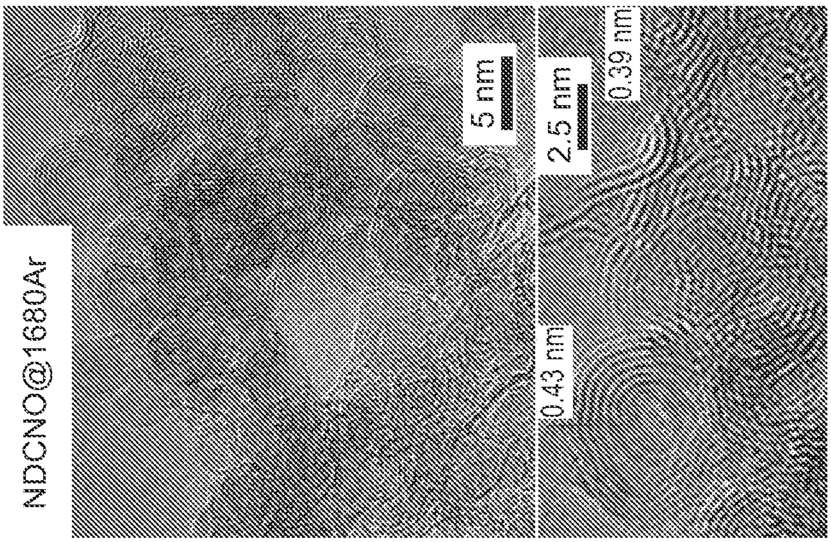
Figure 2D:
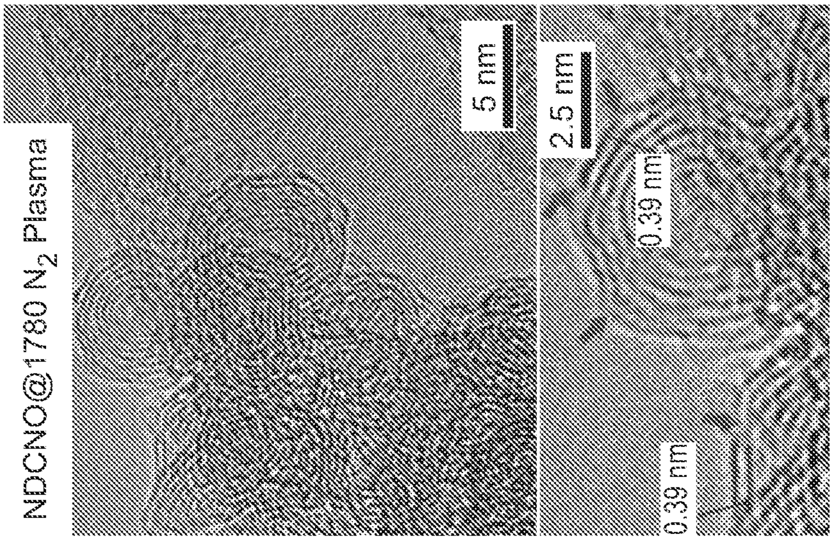
Figure 2E:
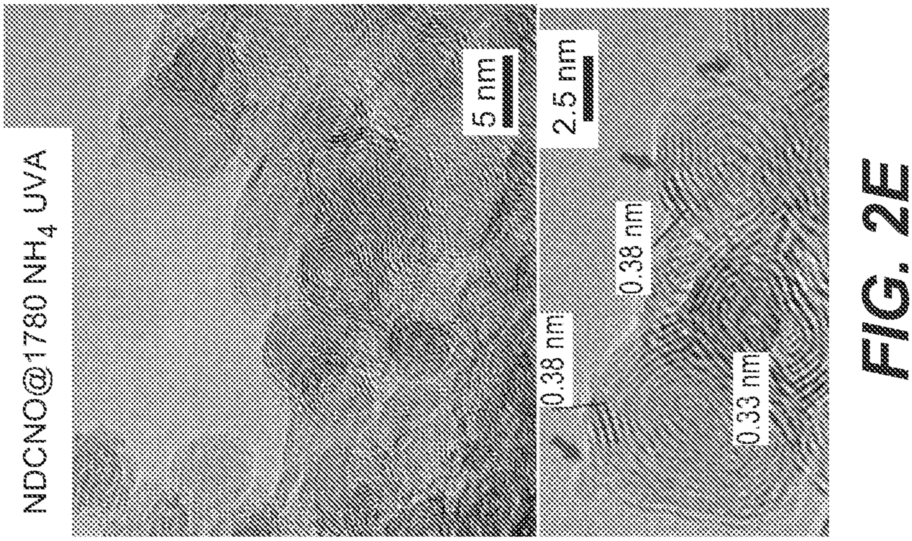
Figure 2F:
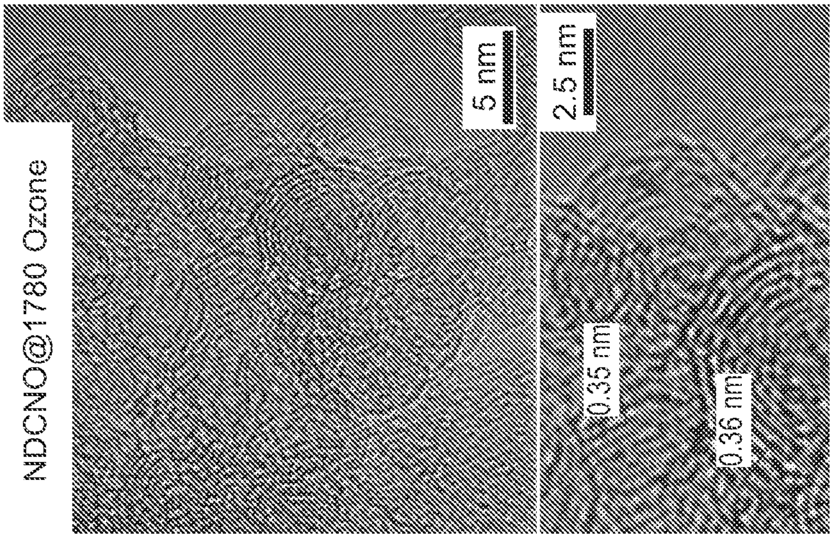
Figure 7A:
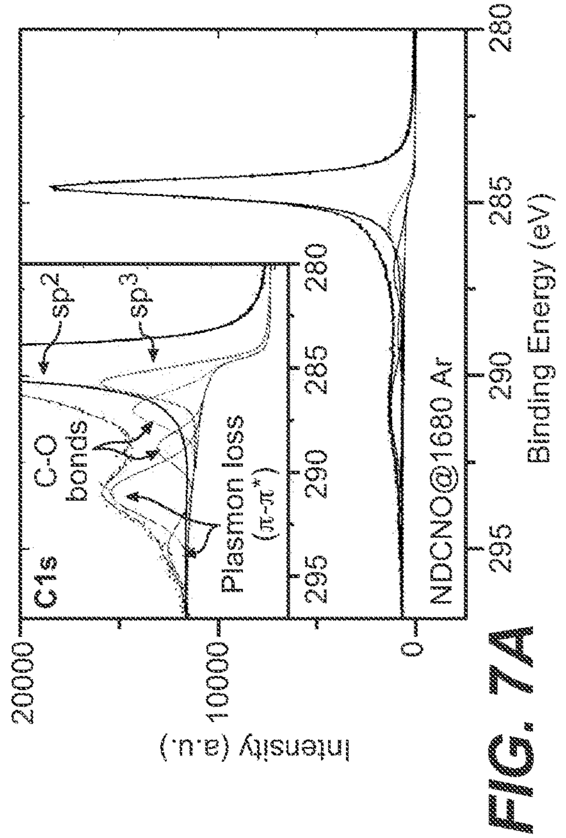
FIGS. 7A, B, C, D, E, and F are graphs of X-Ray Photoelectron spectroscopy of the CNOs synthesized in accordance with some embodiments disclosed herein and their functionalized variants: (A) NDCNO@1680 Ar; (B) NDCNO@1780; (C) NDCNO@2500; (D) CNO@1780 $N_2$ Plasma; (E) CNO@1780 NH4 UVA; and (F) CNO@1780 Ozone.
Figure 7B:
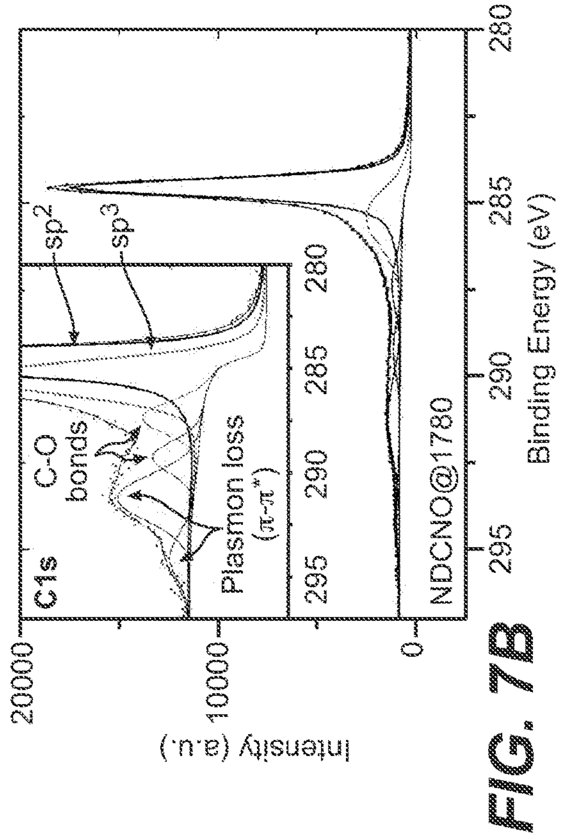
Figure 7C:
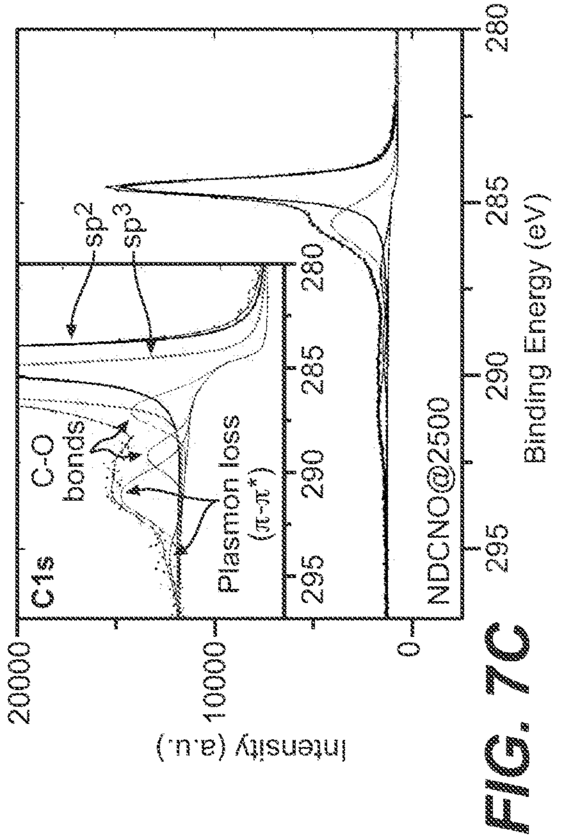
Figure 7D:
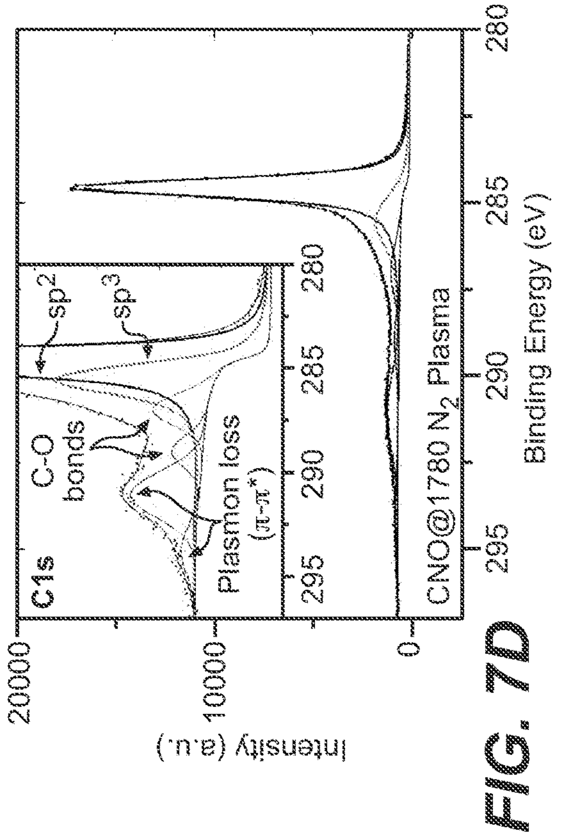
Figure 7E:
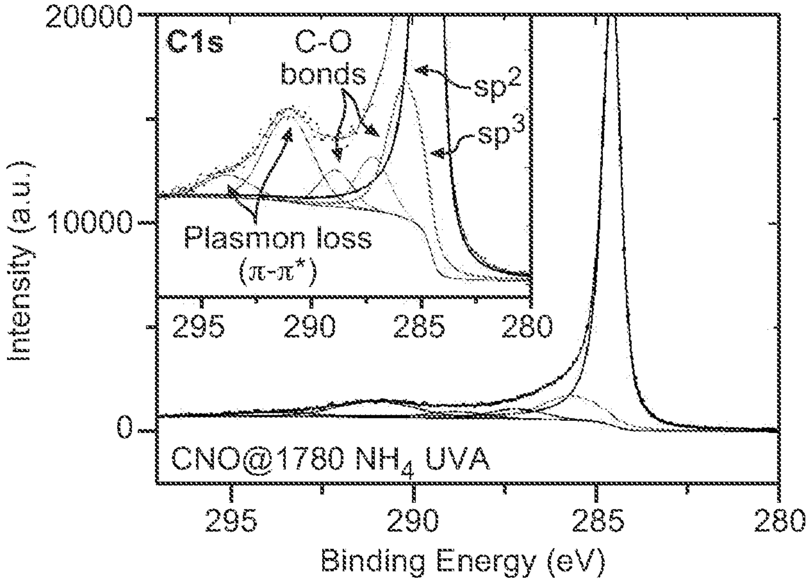
Figure 7F:
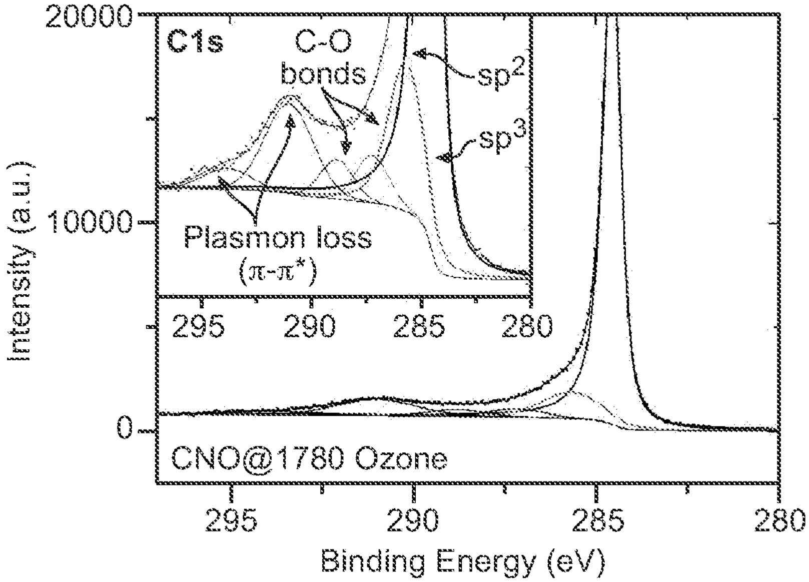
Figure 10A:
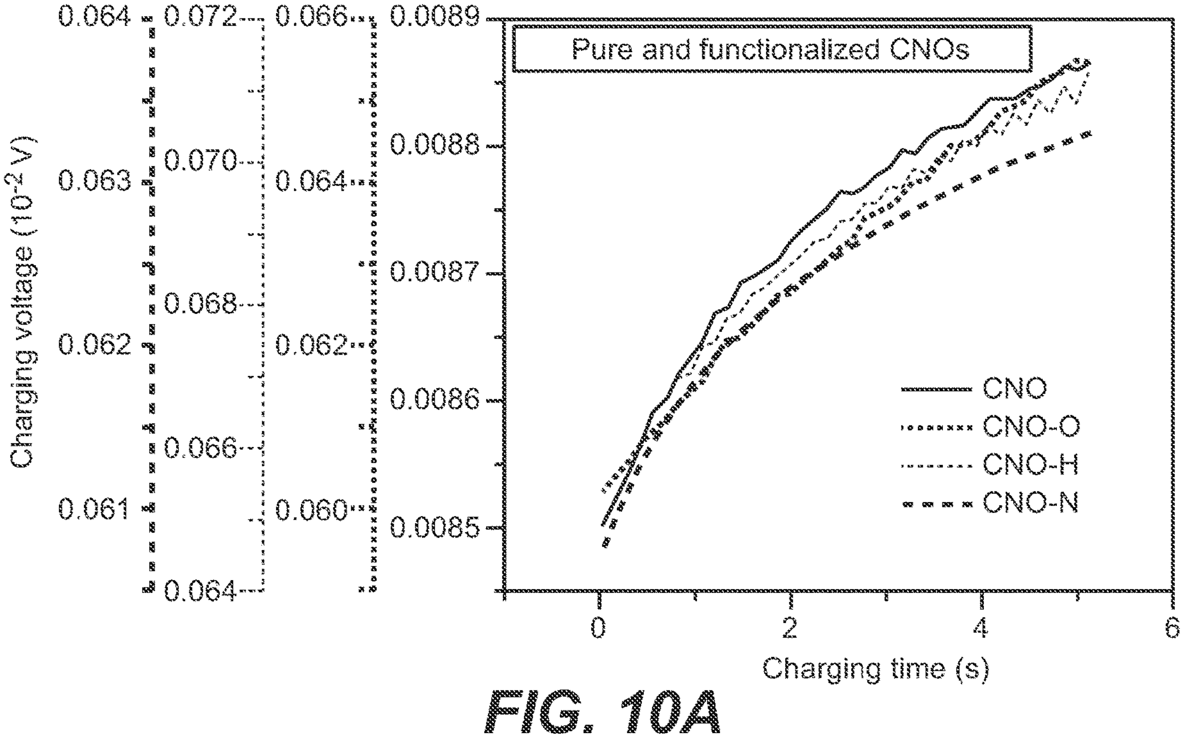
FIGS. 10A and B are graphs of charging time of supercapacitors with active electrode material of (A) CNOs pure and functionalized and (B) CNOs pure and functionalized with PANI addition in accordance with some embodiments disclosed herein.
Figure 10B:
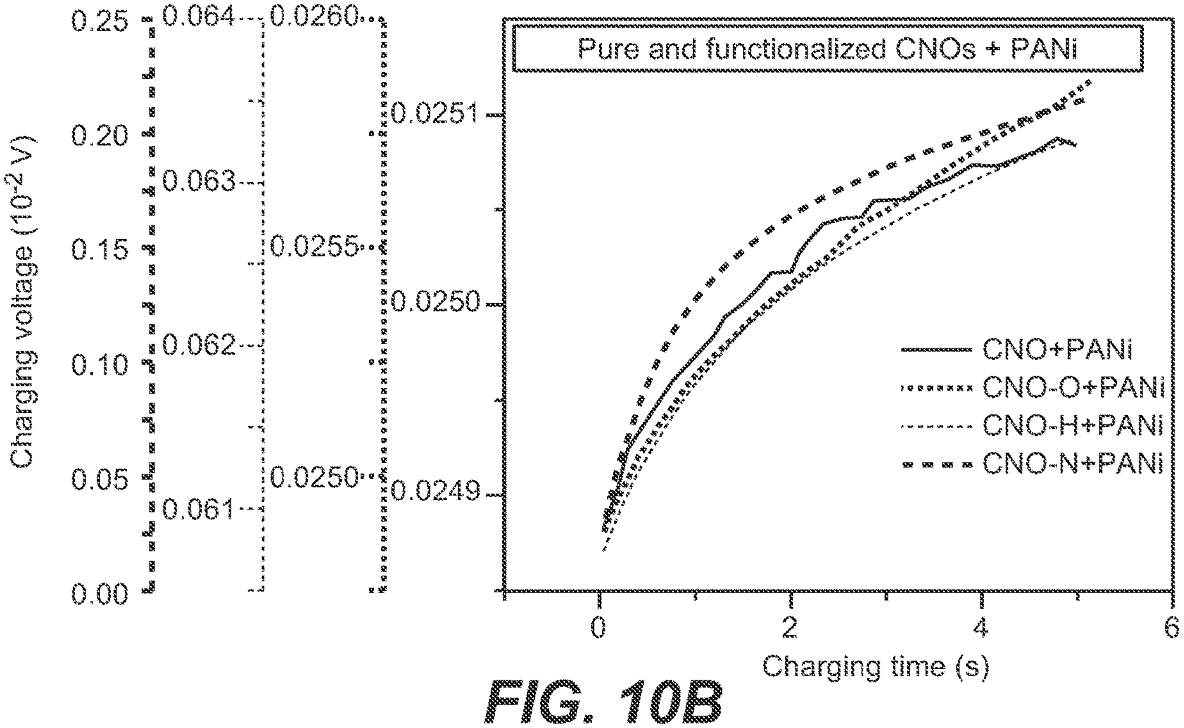

Disclosed herein are methods of CNO synthesis, methods of carbon material functionalization as well as methods of forming polyaniline/carbon (i.e., PANI-carbon) composites. In some embodiments, the CNO synthesis methods are carbon material (e.g., nanodiamond (ND)) based. In other embodiments, the CNO synthesis is chemical-based. The functionalization methods disclosed herein can have the capability of functionalizing carbon nanomaterials with nitrogen, hydrogen, oxygen, ozone, and/or amine. In some embodiments, the nitrogen and hydrogen can share a similar method but use a different source gas.

The methods disclosed herein can address many of the challenges faced by those in the art such as bulk production of high-quality CNOs, functionalization of carbon materials to add beneficial properties, and formation of PANI-carbon composites for applications that require a large surface area. As such, this application can outline a method flow of production of high-quality CNOs in bulk, followed by the functionalization of said CNOs to give it desirable properties, followed by the formation of PANI-carbon composites using the functionalized CNOs for use in applications where a large surface area is of importance such as, but not limited to, supercapacitor electrodes.

CNO is a concentric shell of $sp^2$ carbon that belongs to a class of graphene-like nanomaterials where it shares many of the characteristics with its parent structure graphene. For this reason, CNOs pertain to the characteristics that are closely related to other $sp^2$ carbon materials. These other $sp^2$ carbon materials include, but are not limited to, carbon nanotube (CNT), Buckminsterfullerene, graphene, graphene nanoribbon, graphene platelets, carbon pills, hybrid $sp^2$ structures, $sp^2$ fragments and their functionalized, single-layered and multi-layered variants of the said $sp^2$ carbon materials which can be of natural, artificial, or derivative origin. Because CNOs have a similar chemical property to the other $sp^2$ carbon materials, the methods disclosed herein of functionalization and PANI-carbon composites can also apply to the other $sp^2$ carbon materials. As such, the methods disclosed herein can also be for other $sp^2$ carbon materials besides CNOs.

In addition, the methods of functionalization and PANI-carbon composite formation can make use of the a bonds present in both $sp^2$ carbon and $sp^3$ carbon. As such, the methods of functionalization and PANI-carbon composite making disclosed herein can also be used for $sp^3$ carbon materials such as, but not limited to, nanodiamond, diamondoid, single-crystal diamond, polycrystalline diamond, diamond-like carbon, sintered diamond, amorphous diamond, diamond powder and doped variants of the said $sp^3$ carbon materials which can be of natural, artificial, or derivative origin.

CNOs are known to have a wide range of novel properties such as, but not limited to, high electrical conductivity, large surface area, adjustable diameter/reactivity, high thermal stability, and activation.

CNOs are known to have a high electrical conductivity due to the $\pi$ bond that contributes to the free-flowing electrons between the concentric shells. Typically, this is in the range of about 2-4 S/cm depending on the size of the CNOs. This can be particularly useful when CNOs are used as electrodes of supercapacitors as the conductivity is significantly higher than the conductivity of activated carbon 0.93 S/cm which is the most commonly used electrode material in the art. Since the performance of the supercapacitor is tied to the conductivity of the electrode, the use of CNOs that have a higher electrical conductivity can manifest as an improvement over previous attempts in the art.

CNOs are known to have a large surface area, typically in the range of 30-500 $m^2g^{-1}$ but can be as large as 2000 $m^2/g$. This can provide numerous benefits. First, by having a large surface area, CNOs can have a greater surface area for the functional groups to be added to using the functionalization methods disclosed herein. Second, when used as an electrode material for supercapacitors, CNOs can have a greater surface area for the electrolyte ions to interact with. Since the performance of the supercapacitor along with electrical conductivity is tied to the ion interactable surface area, the use of CNOs that have a greater surface area can manifest as an improvement over previous attempts in the art.

CNOs have a concentric shell of $sp^2$ carbon. As such, by increasing the number of layers, one can increase the diameter of the CNOs typically between about 5-100 nm. It is generally accepted in the art that the smaller the diameter of the CNOs are, the greater the reactivity of the CNOs will be due to the energetic strain put on the bonds by the curvature. In addition, it is generally beneficial to have smaller CNOs for use with the functionalization methods disclosed herein. Accordingly, the CNO synthesis methods disclosed herein can synthesize CNOs that have a diameter of about 6.6±0.1 to about 16.7±0.3 nm.

It is also important to note that CNOs and other $sp^2$ carbon materials can break down in stages. For example, the weaker bonds present in the defects such as, but not limited to, Schottky defect and Stone-Wales defects can break down first. As such, the functionalization processes disclosed herein the CNOs and other $sp^2$ carbon materials can maintain their structural integrity and intrinsic property accordingly even where some of the bonds at the defects are broken.

CNOs, as well as other $sp^2$ carbon material, are known to be able to be activated (i.e., a state where the $sp^2$ carbon shells are perforated). This activation can occur typically at, but not limited to, defects sites for the reasons explained above. Activation can allow for multiple benefits. First, it can allow for a greater surface area for the functionalization to occur. Second, when used as a large surface area material such as, but to limited to, an electrode material for supercapacitors, it can allow for greater interactable surfaces for electrolyte ions.

The CNOs synthesized using the methods disclosed herein can have a wide range of applications. These include, but are not limited to, pharmaceutical drug carriers, biomarkers, cancer treatment, handling and protection of air-sensitive materials, nanomagnets, optical limiting, catalysis, gas storage (such as but not limited to hydrogen storage for vehicles), photovoltaic & fuel cells, lubricants additives for aerospace applications, electronics, energy conversion and storage, Li-ion electrochemical energy-storage devices, supercapacitors, hyper-lubricants, sensors, and biological and environmental applications.

CNOs can be synthesized by several methods such as, but not limited to, electron beam irradiation, arc discharge, chemical vapor deposition, ion implantation, pyrolysis, chemical conversion, and annealing. The CNO synthesis methods disclosed herein can include pyrolysis, chemical conversion, and annealing. Of the listed CNO synthesis methods, chemical vapor deposition and annealing can produce CNOs in bulk with nearly a 100% conversion of NDs to CNOs using annealing.

The CNO synthesis methods disclosed herein can synthesize high-quality CNOs in bulk, to the point where it can be commercially viable. A closely related $sp^2$ carbon is CNTs. CNTs previously were confined to research use due to the limitation in the bulk production method where arc discharge was commonly used. However, CNTs are now widely used in the commercial space due to it being economically viable. This transition was made possible by thermal decomposition, a process where a starting material is placed in a thermal chamber in carbon gas where the CNTs could be mass-produced. By a similar token, the methods disclosed herein make use of a starting material and can mass-produce CNOs in a thermal chamber or vessel, thereby making CNOs a more economically viable option.

The following examples are included for demonstrational purposes are a non-limiting example of the various methods disclosed herein.

Methods of Forming CNOs

In some embodiments, the method of forming CNOs can include adding at least one carbon material to a vessel or chamber. As used in the methods disclosed herein, the at least one carbon material can include nanodiamond, diamondoid, single-crystal diamond, polycrystalline diamond, diamond-like carbon, sintered diamond, amorphous diamond, diamond powder, and doped variants thereof. In some embodiments, the at least one carbon material is of natural, artificial, or derivative origin.

For example, the CNOs can be bulk synthesized from NDs. NanoAmando© Hard Hydrogel purchased from New Metals and Chemicals Corp., LTD, or equivalent can be used as starting carbon material. The average ND size used in the experiment was confirmed by Transmission Electron Microscopy (TEM) images to be about 4.7±0.6 nm in about 99% abundance (as seen from FIG. 1) with a surface area on an aggregate of about 283.8 $m^2/g$ confirmed by Brunauer-Emmett-Teller (BET) analysis. In the example, about 10 mg of nanodiamond powder was filled into about 1 cm diameter graphite crucible or equivalent and placed in a vacuum furnace (i.e., chamber/vessel) from Thermal Technology or equivalent. The at least one carbon material can be annealed in this vessel/chamber. The heating rate in the chamber/vessel can be controlled manually, automatically, or otherwise. In some embodiments, the chamber/vessel is heated to about 1000-4000° C., about 1000-3000° C., about 1000-2000° C., or about 1500-2000° C. In addition, the chamber/vessel can include at least one inert gas. In some embodiments, the inert gas can be nitrogen, carbon dioxide, argon, helium, neon, krypton, xenon, and/or radon. For example, the vacuum furnace in this example was heated to the point the temperature reached about 1680° C. under the flow of an inert gas such as but not limited to argon. In some embodiments, the average-heating rate of the annealing process can be about 1-50° C. $min^{-1}$, about 5-30° C. $min^{-1}$, about $10^{-20}$° C. $min^{-1}$, or about 15-20° C. $min^{-1}$. In some embodiments, the average-heating rate of the annealing process can be about 50-100° C. $min^{-1}$, about 50-75° C. $min^{-1}$, or about 50-70° C. $min^{-1}$. In some embodiments, the pressure in the chamber/vessel where the annealing occurs can be about $10^{-2}$-$10^{-7}$ Pa, about $10^{-3}$-$10^{-6}$ Pa, about $10^{-4}$-$10^{-6}$ Pa, or about $10^{-4}$-$10^{-5}$ Pa. In some embodiments, the pressure in the chamber/vessel where the annealing occurs can be about $10^{-1}$-$10^{-7}$ mBar. In some embodiments, the annealing process can last about 1 min to 24 hours, about 1 min to 12 hours, about 1 min to 6 hours, about 1 min to 1 hour, about 1 min to 30 mins, or about 10 min to 30 mins. The average-heating rate in this example was about 16° C. $min^{-1}$ and the pressure was fluctuating between about $3.80\times10^{-4}$ Pa to about $4.5\times10^{-5}$ Pa and the samples were left inside the chamber for about 20 min. The CNOs synthesized in this example are named NDCNO@1680 Ar in the Figures.

In some embodiments, the at least one carbon material can be wrapped in a sheet of graphitic material before being added to the annealing chamber/vessel. In some embodiments, the sheet of graphitic material can include at least one graphitic material with a thickness of up to about 15 mm, up to about 10 mm, up to about 5 mm, up to about 3 mm, up to about 1 mm, up to about 0.5 mm, or up to about 0.25 mm. In some embodiments, the chamber/vessel can be a vacuum hot press.

In another example, the CNOs were bulk synthesized from the same NanoAmando© NDs or equivalent used in the above example in a vacuum hot press from FCT (Type HP W) or equivalent. About 10 mg of nanodiamond powder was wrapped inside a thin graphitic sheet of about 0.2 mm thickness, which was placed inside about 10 cm diameter and about 11 cm height graphite crucible. The sample was heated to about 1780° C. or about 2500° C. with a heating rate of about 60° C. $min^{-1}$ inside the hot press under vacuum condition with the pressure of about $2.5\times10^{-3}$ Pa. The CNOs synthesized in this example are named NDCNO@1780 and NDCNO@2500 in the Figures.

The above two ND based CNO synthesis methods/examples have the additional benefit of low cost. Due to the improvement in bulk production of its raw materials ND, the above two examples are a cost-effective production method of CNOs. Additionally, the above two CNO examples produced smaller CNOs (about 5.99 nm to about 7.54 nm) as seen from FIG. 2 and FIG. 3 which can have a higher reactivity. This can provide the added benefit of easier functionalization and post-synthesis processes such as but not limited to, activation, pharmaceutical drug addition, fluorescent/phosphorescent marker addition, mesopore/micropore formation, and gas storage. The TEM images show that the graphitization of nanodiamonds can lead to highly ordered CNO structures and conversion from $sp^3$ to $sp^2$ structure. The increase in annealing temperature of nanodiamonds can result in larger diameter and crystallite size CNOs where the temperatures are more than 2000° C.

In some embodiments, CNOs can be formed from copper chloride hydrate and calcium carbide. In some embodiments, copper chloride hydrate ($CuCl_2 \cdot 2H_2O$) or similar and Calcium Carbide ($CaC_2$) or similar can be mixed in a vessel/chamber. In some embodiments, the mixing ratio of copper chloride hydrate to calcium carbide can be about 2:1 to 5:1, about 2.5:1 to 4:1, or about 3:1 to 4:1. In this example, about 50 g of $CuCl_2 \cdot 2H_2O$ and about 16 g of $CaC_2$ (mixing ratio 10:3.2) was placed into 316 stainless steel bolted closure pressure vessel or equivalent purchased from Parker Autoclave Engineers or equivalent with about 300 ml nominal capacity, about 45.97 mm internal cylindrical container diameter and ability to withstand a pressure of up to about 350 bar at the temperature of about 850° C. Once in the vessel, the copper chloride hydrate and calcium carbide mixture can be annealed. In some embodiments, the annealing temperature can be about 1-1500° C., about 500-1500° C., about 500-1000° C., or about 700-900° C. In some embodiments, the annealing can occur for 1 min to 24 hours, about 1 hour to 24 hours, about 6 hours to 24 hours, or about $10^{-15}$ hours. In this example, the pressure vessel containing the chemicals was sealed carefully and placed into the oven or equivalent at about 800° C. for a period of about 12 hr. After annealing, the contents of the vessel can be cooled (to ambient temperature for example). In some embodiments, the cooling comprises at least one of natural cooling, running coolants, cooling bath, heatsink, and airflow cooling. In the example, after annealing, the contents were slowly or quickly cooled down and remained untouched for a period of about 8 hr until it reached about ambient temperature. The products inside the vessel can be collected and filtered with at least one filtering agent. In some embodiments, the filtering agent can include ammonia (ammonia solution ($NH_3 \cdot 3H_2O$)) or similar and/or carbon tetrachloride ($CCl_4$) or similar. In some embodiments, the ratio of ammonia to carbon tetrachloride in the filtering agent can be 4:1 to 15:1, 6:1 to 12:1, 8:1 to 10:1, or 9:1. In this example, products inside the pressure vessel were collected and filtered about five times using a liquid mixture of ammonia solution ($NH_3 \cdot 3H_2O$) and carbon tetrachloride ($CCl_4$). After filtration, the products can be rinsed with at least one rinsing agent. In some embodiments, the rinsing agent can include hydrochloric acid and/or de-ionized water. In some embodiments, the ratio of hydrochloric acid to de-ionized water in the rinsing agent can be 1:1 to 1:8, 1:2 to 1:6, 1:3 to 1:5, or 1:4. In the example, after the filtration process, the remaining product was washed about four times to remove the soluble residuals using the mixture of dilute hydrochloric acid (HCl) and de-ionized water. In some embodiments, the rinsed product is then heated. In some embodiments, the rinsed product is heated to a temperature of about 1-200° C., about 20-150° C., about 50-100° C., or about 70-90° C. In some embodiments, the rinsed product can be heated for 1 min to 24 hours, 1 hr to 24 hours, or 12 hours to 20 hours. In the example, the remaining product was heated inside the oven or equivalent at the temperature of about 80° C. for a period of about 15 hr. This example successfully produced large amounts of CNOs verified via TEM (FIG. 4). The above example has the advantage of producing high quantities of CNOs of uniform size as seen from FIG. 4 and FIG. 5 at a low cost due to the low cost of the raw materials. Notably, the size of CNOs can vary according to their functionalization where the diameter can vary from about 6.6 nm to about 16.7 nm.

Method of Functionalizing Carbon Materials (e.g., CNOs)

The carbon materials that can be functionalized by the methods described below can be the CNOs created by any of the embodiments disclosed herein. In some embodiments, the carbon materials to be functionalized include at least one of nanodiamonds, diamondoids, single-crystal diamonds, polycrystalline diamonds, diamond-like carbons, sintered diamonds, amorphous diamonds, diamond powders, and/or doped variants thereof. In some embodiments, the carbon materials to be functionalized include carbon nano-onions, carbon nanotube, Buckminsterfullerene, graphene, graphene nanoribbon, graphene platelets, carbon pills, hybrid $sp^2$ structures, $sp^2$ fragments, and/or their functionalized, single-layered and multi-layered variants thereof. In some embodiments, the carbon materials to be functionalized are of natural, artificial, or derivative origin.

In some embodiments, a method of nitrogen or hydrogen functionalizing carbon materials can include adding at least one carbon material to a plasma chamber. In some embodiments, the carbon materials are nitrogen functionalized using nitrogen plasma or similar plasma. An example of nitrogen functionalization includes adding about 10 mg of carbon material uniformly piled at the bottom of a molybdenum crucible or equivalent and placed into the Direct Current (DC) or Microwave Enhanced (ME) Plasma Enhanced Chemical Vapour Deposition (PECVD) or equivalent chamber with nitrogen gas or similar (or hydrogen if hydrogen functionalization) running inside the chamber. In some embodiments, once in the plasma chamber, the carbon material can be heated to a temperature of about 50-400° C., about 100-300° C., or about 150-250° C. In some embodiments, the pressure in the plasma chamber can be about 100-10,000 Pa, about 500-7500 Pa, or about 1000-6000 Pa. In some embodiments, the heating can be for 1 min to 12 hours, 10 min to 3 hours, 10 min to 1 hour, or 20 min to 40 min. In this example, the sample was preheated at about 200° C. with nitrogen flow at about 30 SCCM under the pressure of about 1,333 Pa to about 5,333 Pa for the duration of about 30 min. In some embodiments, the flow of the gas in the plasma chamber can be about 5-100 SCCM, about $10^{-60}$ SCCM, or about 20-40 SCCM. After preheating, the carbon material can be exposed to plasma in the plasma chamber for 1 min to 6 hours, 10 min to 1 hour, or 15 min to 35 mins. In the example, pre-heating was followed by the ignition and running of the plasma for about 25 min to about 30 min. After plasma exposure, the product can be cooled (to ambient temperature for example). In some embodiments, the cooling includes at least one of natural cooling, running coolants, cooling bath, heatsink, and airflow cooling. Plasma exposure in the example was followed by a cooling procedure by leaving the sample under nitrogen flow for about 1 hr. The sample can be cooled down to about ambient temperature. Finally, nitrogen gas can be cut and pumped out. The same conditions can be used except with hydrogen instead of nitrogen for embodiments that utilize hydrogen functionalization. In some embodiments, a mixture of gas could be used where the hydrogen component of the plasma could be used to incinerate $sp^2$ carbon if required. The effects of nitrogen and hydrogen functionalization can be seen from FIG. 2, FIG. 3, FIG. 4, FIG. 5, FIG. 7, FIG. 8, and FIG. 9.

In some embodiments, the carbon material can be oxygen functionalized using chemical reagents or using oxygen plasma. In some embodiments, the oxygen functionalization can be the same as the nitrogen or hydrogen functionalization except oxygen gas is utilized for oxygen plasma. In some embodiments, a method of oxygen functionalizing carbon materials includes heating at least one carbon material in an oxidizing solution that includes sulfuric acid, nitric acid, and ammonium persulfate. In one example, carbon materials can be treated using a concentrated solution of sulfuric acid or similar, nitric acid, or similar (of ratio about 3:1 v/v, of about 96% and about 70% respectively in concentration) and ammonium persulfate or similar. In some embodiments, the volume ratio of sulfuric acid to nitric acid is about 1:1 to 5:1 or about 2:1 to 4:1. The oxidizing solution can be prepared by adding about 30-35 g of ammonium persulfate ($(NH_4)_2S_2O_8$) or similar into about 30 ml of concentrated sulfuric acid ($H_2SO_4$) or similar and nitric acid or similar. In some embodiments, the concentration of ammonium persulfate in the oxidizing solution can be about 90-99.99%, about 95-99.99%, about 98-99.99%, about 99-99.99%, or about 99.2%. In some embodiments, the carbon material in the oxidizing solution can be heated to a temperature of about 75-250° C., about 75-125° C., or about 90-110° C. In the example, the oxidizing solution was heated to reach about 100° C., then the carbon materials were added and heated for a period of about 40 min. In some embodiments, the heating can be for about 1 min to 24 hr, about 1 min to 6 hours, about 1 min to 1 hour, or about 30 min to 1 hour. After heating for a period of time, the at least one carbon material in the oxidizing solution can be cooled to a temperature of about 25-75° C., about 30-70° C., or about 40-60° C. In some embodiments, the cooling can be at least one of natural cooling, running coolants, cooling bath, heatsink, and airflow cooling. In some embodiments, the at least one carbon material in the oxidizing solution can be rinsed with at least one rinsing agent after cooling. In some embodiments, the rinsing agent is deionized water. After rinsing, the at least one carbon material can be filtered out of the oxidizing solution. Finally, the at least one carbon material can be dried for about 1 min to 72 hours. In some embodiments, the drying can include at least one of an atmospheric drying, heating, vacuum drying, and airflow drying. In the example, after the heating period, the sample can be cooled down to about 50° C. which can take about 20 min and then the solution can be rinsed using the DI water. Finally, the oxygen-terminated carbon materials were filtered, collected, and left to dry at room temperature. The effects of oxygen functionalization can be seen from FIG. 4, FIG. 5, and FIG. 9.

In some embodiment, the carbon material can be ozone functionalized. Ozone functionalization can be carried out by exposing the carbon material to ozone using an exposure chamber with an ozone generator (i.e., ozone chamber) such as but not limited to Ozonia TOGC2W100201 or equivalent. In one example, about 10 mg of carbon material can be uniformly piled at the bottom of a molybdenum crucible or equivalent with a filter on top and placed into the chamber. Once the carbon material is in the ozone chamber, the carbon material can be heated. In some embodiments, the temperature the ozone chamber is heated to is about 50-400° C., about 50-200° C., about 75-150° C., or about 75-125° C. In addition, the ozone chamber can also be pressurized during heating. In some embodiments, the ozone chamber has a pressure of about $10^{-1}$-$10^{-7}$ mBar, about $10^{-2}$-$10^{-6}$ mBar, or about $10^{-3}$-$10^{-5}$ mBar. In some embodiments, heating the carbon material in the ozone chamber lasts for about 1 min to 12 hours, about 1 min to 6 hours, about 1 min to 1 hour, or about $10^{-30}$ min. In this example, the carbon material was heated at about 100° C. for a duration of about 20 min. After heating, the carbon material can be exposed to ozone in the ozone chamber for about 1 min to 6 hours, about 1 min to 3 hours, about 1 min to 1 hour, about $10^{-50}$ min, or about 20-40 min. In some embodiments, the ozone flow rate can be up to 10.0 g/h ozone. In this example, the ozone generation was initiated after heating and continued for about 30 min. After ozone exposure, the carbon material can be cooled to ambient temperature. In some embodiments, the cooling can include at least one of natural cooling, running coolants, cooling bath, heatsink, and airflow cooling. After about 30 min, the sample in the example was cooled to about room temperature in ozone or similar. Once the sample had reached about room temperature, the ozone generation was stopped, the oxygen flow to the chamber was shut off and the chamber was pumped down to remove gases before venting. The effects of ozone functionalization can be seen from FIG. 2, FIG. 3, FIG. 6, FIG. 7, and FIG. 8.

In some embodiment, the carbon material can be amine-functionalized using ultraviolet light (i.e., photoexcitation). In some embodiments, carbon material can be added to an ultraviolet chamber having a pressure of about $10^{-5000}$ Pa, about 100-4000 Pa, about 500-3000 Pa, or about 1000-2000 Pa. The chamber can have a flow of ammonia ($NH_3$) gas at a flow rate of about 5-100 SCCM, about $10^{-70}$ SCCM, or about 20-40 SCCM. Once in the chamber, the carbon material can be exposed to ultraviolet light in the presence of the ammonia gas for about 1 min to 12 hours, about 1 min to 6 hours, about 1 min to 1 hour, about $10^{-50}$ min, or about 20-40 min. In an example, about 10 mg of carbon material can be uniformly piled at the bottom of a molybdenum crucible and placed into the chamber with $NH_3$ gas or similar flow at about 30 SCCM under the pressure of about 1,333 Pa for the duration of about 30 min. After this step, with the similar or same flow conditions, the ultra-violet light can be focused on the sample for the duration of about 30 min. Once the previous step is complete, the $NH_3$ flow can be cut and pumped out. The effects of amine functionalization could be seen from FIG. 2, FIG. 3, FIG. 6, FIG. 7, and FIG. 8.

Through the contact angle measurement using Krüss Drop Shape Analysis system (DSA 10 MK2) or equivalent in a powder sample holder in equivalent was used for taking contact angle measurements and the values were calculated using Drop Shape Analysis software or equivalent. A constant volume of 2 µl of the DI water droplet was used for all carbon material samples in which nitrogen, amine, and ozone functionalization were found to significantly increase the solubility of carbon material in aqueous solution through an increase in hydrophilicity that has withstood the 6-month endurance test which can allow greater prospect for applications to benefit from being able to easier process carbon materials and alternatively allows further functionalization to enable further addition of beneficial characteristics.

In some embodiment, the carbon materials can be incorporated into polyaniline to form a PANI-carbon composite. In some embodiments, the PANI-carbon composite can be used in an electrode (e.g., a supercapacitor electrode). In some embodiments, the PANI-carbon composite can be overlaid with any carbon material disclosed herein including the created CNOs or functionalized carbon materials to be used as an electrode, for example. In some embodiments, the overlaid carbon material is CNOs which include those made by the methods disclosed herein.

In some embodiments, a PANI-carbon composite can be synthesized in the following manner: High surface area reduced graphene oxide was purchased from graphene Laboratories Inc. located in the USA. The black colored sample had a surface area of 833 $m^2g^{-1}$ with 98% solid content and carbon/oxygen ratio of 10.5. The average flake thickness was 1 monolayer with an average particle size of 3 to 5 microns, which was synthesized using Hummer's method. For the preparation of graphene/polyaniline composite, 0.25 M aniline monomers and 10 mL of 95% ethanol were added to 30 mL of 1 M HCl solution. Then 10 mg of reduced graphene oxide were added to a 135 mL suspension prepared in the previous step, mixed and sonicated for 60 mins. Following that, the mixture was kept in an ice-water bath with stirring to cool it to around 2° C. Then 2.5 g of Ammonium Persulfate in 40 mL of 1 M HCl was added to the mixture and kept between 0° C. to 4° C. The resulting suspension was stirred at ambient temperature for 24 hours and the mixture was washed and filtered with distilled water and ethanol repeatedly to wash away the residual oxidants. Finally, the solids were dried under vacuum at ambient temperature for 24 hours.

In some embodiments, a PANI-carbon composite can be formed by mixing aniline monomer, ethanol, and hydrochloric acid to form a first suspension. In some embodiments, the total volume of the first suspension can be about 50-300 mL, about 100-200 mL, about 120-150 mL, or about 135 mL. In some embodiments, the volume of ethanol in the first suspension is about 1-30 mL, about 1-20 mL, about 5-15 mL, or about 10 mL. In some embodiments, the volume of hydrochloric acid in the first suspension is about 10-100 mL, about $10^{-50}$ mL, about 20-40 mL, about 25-35 mL, or about 30 mL. In some embodiments, the volume of aniline monomer in the first suspension is about 50-200 mL, about 50-150 mL, about 75-125 mL, about 90-110 mL, or about 95 mL. In some embodiments, the volume ratios of ethanol to hydrochloric acid to aniline monomer in the first suspension is about 0.1-3:2-4:8.5-10.5, about 0.5-1.5:2.5-3.5:9-10, or about 1:3:9.5. In some embodiments, the concentration of aniline monomer added to the first suspension can be about 0.1-0.4 M, about 0.15-0.35 M, about 0.2-0.3 M, or about 0.25 M. In some embodiments, the concentration of the hydrochloric acid added to the first suspension can be about 0.5-3M, about 0.75-1.25 M, or about 1 M. In one example, about 0.25 M aniline monomers or similar, and about 10 ml of about 95% ethanol or similar were added into about 30 ml of about 1 M HCl solution or similar. At least one carbon material can then be added to the first suspension to form a second suspension. In some embodiments, the carbon materials include nanodiamonds, diamondoids, single-crystal diamonds, polycrystalline diamonds, diamond-like carbons, sintered diamonds, amorphous diamonds, diamond powders, and/or doped variants thereof. In some embodiments, the carbon materials include carbon nano-onions, carbon nanotube, Buckminsterfullerene, graphene, reduced graphene oxide, graphene nanoribbon, graphene platelets, carbon pills, hybrid $sp^2$ structures, $sp^2$ fragments, and their functionalized, single-layered and multi-layered variants thereof. In some embodiments, the carbon material is of natural, artificial, or derivative origin. Per the example, about 10 mg of carbon materials were added to about 135 ml of the solution prepared in the previous step, mixed, and sonicated for about 60 mins. In some embodiments, the second suspension can be sonicated (e.g., ultrasonicated) for about 1 min to 6 hours, about 30 min to 3 hours, or about 0.5-1.5 hours. In some embodiments, the second suspension can be ultrasonicated at about 20-60 kHz, about 30-50 kHz, or about 40 kHz. After sonicating, the second suspension can be cooled while stirring to a temperature of about −10°-15° C., −5°-10° C., or 0°-5° C. In some embodiments, cooling comprises at least one of natural cooling, running coolants, cooling bath, heatsink, and airflow cooling. In the example, the mixture can be kept in an ice-water bath with stirring to cool it to about 2° C. Next, a mixture that includes ammonium persulfate and hydrochloric acid can be added to the second suspension to form a third suspension that includes the polyaniline/carbon composite while maintaining the temperature of about −10°-15° C., −5°-10° C., or 0°-5° C. In some embodiments, about 1-5 g, about 2-3 g, or about 2.6 of ammonium persulfate can be added to the second suspension. In some embodiments, about $10^{-80}$ mL, about 30-50 mL, or about 35-45 mL HCl can be added to the second suspension. In some embodiments, the strength of the HCl can be about 0.5-3M, about 0.75-1.25 M, or about 1 M.

A polyaniline/carbon composite can be formed when the ammonium persulfate and hydrochloric acid are mixed with the second suspension (which contains the aniline monomer and carbon material) to form the third suspension that includes the polyaniline/carbon composite. This third suspension can be stirred over the period of up to 72 hours at a cooled temperature of about 0° C. to 4° C. Essentially the carbon material can be incorporated into the composite when the aniline monomers polymerizes into PANI which occurs in the presence of ammonium persulfate and at low temperatures over a long period of time. In the example, about 2.5 g of Ammonium Persulfate or similar in about 40 ml of about 1 M HCl or similar was added to the second suspension and was kept between about 0° C. to about 4° C. The third suspension can then be stirred for about 1-72 hours, about 12-36 hours, or about 20-30 hours. In some embodiments, the stirring includes at least one of hand-stirring, automatic stirring, magnetic stirring, ultrasonication, and shear mixing. In some embodiments, after stirring the suspension can be washed with ethanol and deionized water. In some embodiments, the polyaniline/carbon composite can be filtered out of the third suspension. After filtering, the polyaniline/carbon composite can be dried. In some embodiments, drying includes at least one of the atmospheric drying, heating, vacuum drying, and airflow drying. In the example, the resulting suspension was stirred at about ambient temperature for about 24 hr and the mixture was washed and filtered with distilled water or similar and ethanol or similar repeatedly to wash away the residual oxidants. The solids can then be dried under vacuum at about ambient temperature for about 24 hr. The carbon material overlay on the PANI-carbon composite can be carried out by dry fixing the CNO suspension on the PANI-carbon composite.

Figure 12A:
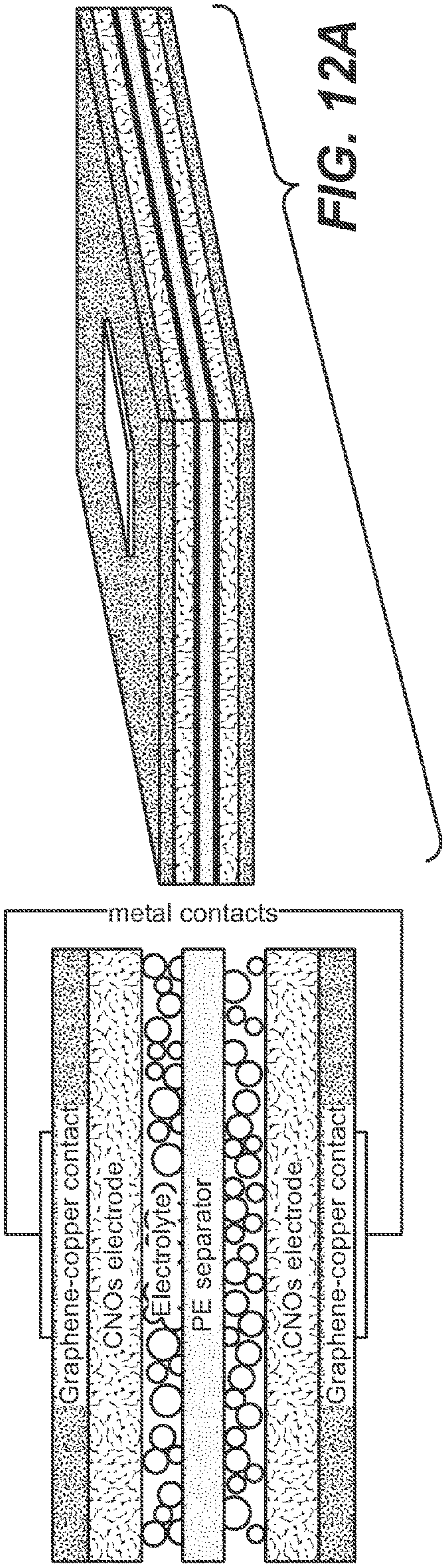
FIGS. 12A and B are schematics of two types of fabricated supercapacitors: (A) CNOs over a single layer of graphene on copper; and (B) with an additional G-PANI layer. These layers are not to scale.
Figure 12B:
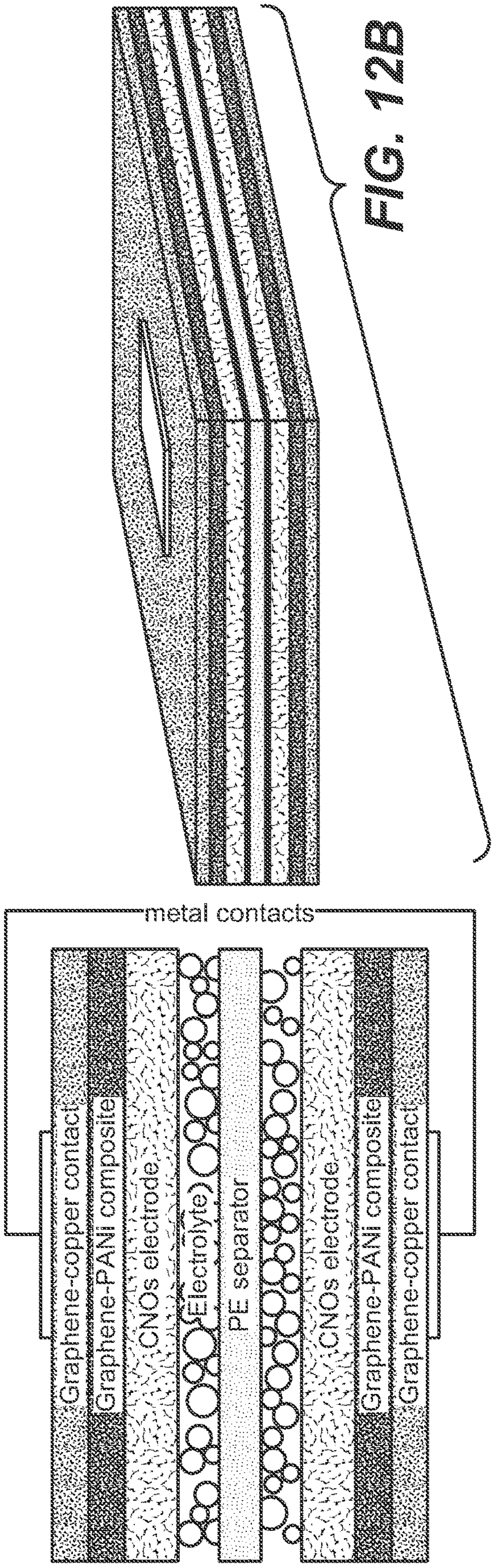

In some embodiments, a supercapacitor can be synthesized in the following manner: Two-electrode supercapacitor cells were built by assembling two 1 $cm^2$ electrodes between a polyethylene (PE) based separator. The separator can be synthesized by mixing 63 g of silica powder ($SiO_2$), 22.5 g of ultra-high molecular weight (UHMW)-PE, and 0.5 g of carbon black with 14 g liquid paraffinic oil inside a 200 mL beaker. All the materials were purchased from Sigma Aldrich. The mixture was extruded under elevated temperature until it reached 120° C. where it kept at this level for the UHMW-PE to be available in the viscous state. The resulting black rubber material was washed with diethyl ether and DI water to remove oil from the surface and placed at 30° C. for a period of 24 h to dry. A lithium perchlorate/ethylene carbonate electrolyte can be used as the organic electrolytic material in the supercapacitor. For the formation of the electrolyte, 1.05 g of lithium perchlorate ($LiClO_4$) which was purchased from Sigma Aldrich, were dried in a vacuum oven at 100° C. before being added into a 200 mL beaker containing 2.5 g of polyethylene oxide (PEO), 1.45 g of ethylene carbonate (EC), and 50 mL of tetrahydrofuran (THF). The mole ratio of lithium ion was kept at 8 compared to polyethylene oxide. Using a magnetic stirrer heater, the mixture was heated at 50° C. where the ebullition occurs, and the mixture was fully mixed. The resulting homogeneous yellowish textured mixture was cast in Petri dishes and left in vacuum for 24 hours to remove the solvent, leading to a jelly electrolyte solution. Finally, the electrolyte was sandwiched between the two electrodes and PE separator by soaking the separator into the electrolyte. Two types of electrodes were fabricated and characterized in this study, one incorporating CNOs over a single layer of graphene on copper purchased from graphene laboratories Inc. located at the USA, and the other having an additional layer of PANI-Graphene over copper with CNOs with or without functionalization which was dry etched on top of them. The thickness of the copper foil in both cases was measured to be 18 μm. The schematic of the fabricated supercapacitors is presented in FIGS. 12A and 12B.

Figure 11:
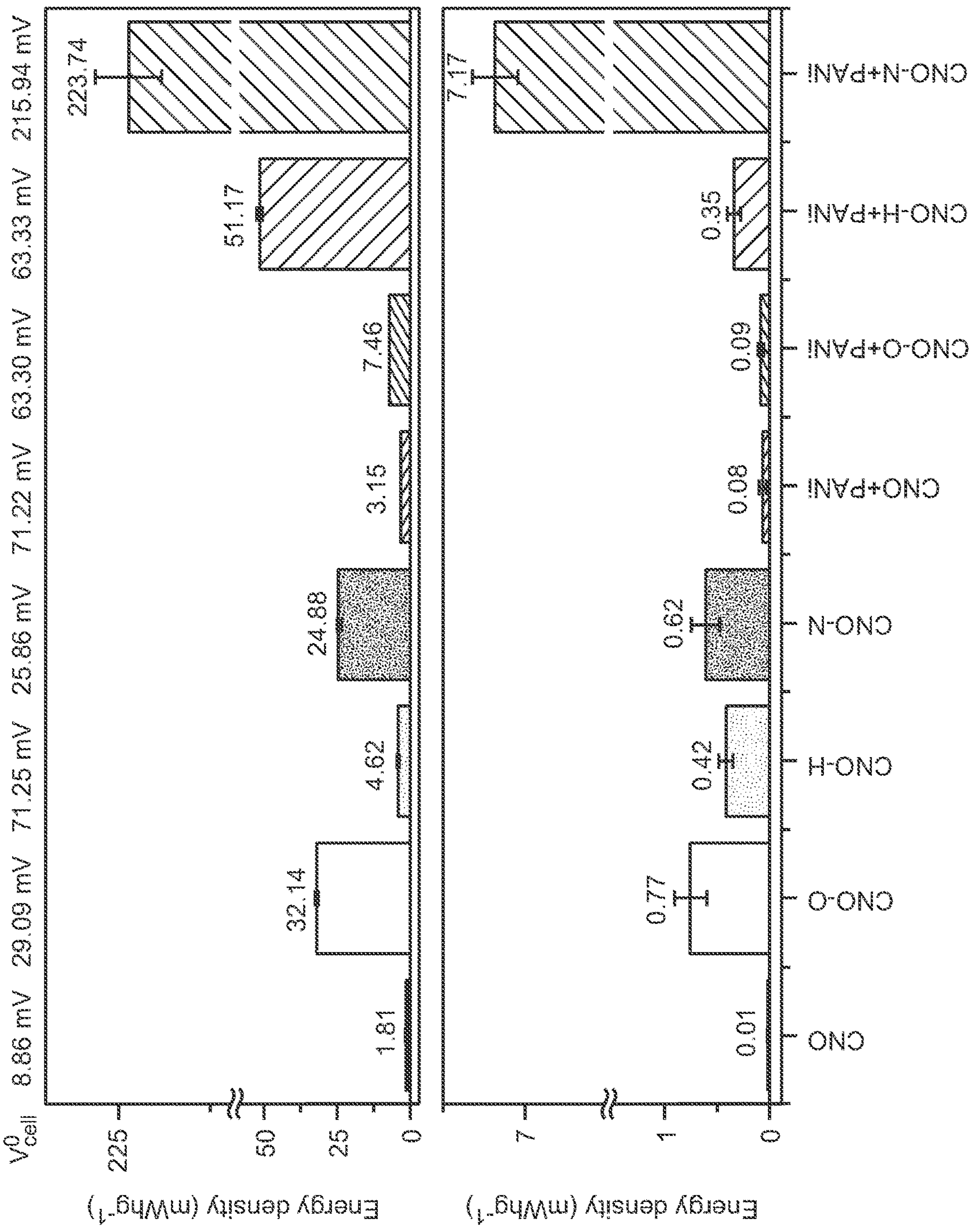
FIG. 11 is a graph of power density and energy density of supercapacitors with different CNOs termination or an additional layer of PANI in accordance with some embodiments disclosed herein.

The benefits brought about by the use of CNOs synthesized in the methods disclosed herein with the functionalization methods also disclosed herein and the use of PANI-carbon composite as electrode also disclosed herein are described and shown in FIG. 4, FIG. 5, FIG. 9, FIG. 10 and FIG. 11. When used as supercapacitor electrodes, the largest specific capacitance of 59.14 F $g^{-1}$ was measured for supercapacitors with electrodes made of CNO-N+PANI, which was an 8.7% improvement over the same structure without the additional layer of graphene/PANI composite, and a 78.2% improvement over supercapacitors with electrodes made of CNOs with no functionalization. As seen in FIG. 11, the use of CNO-N with PANI-carbon significantly increases the performance of the supercapacitor. It should also be noted that there was an increase of mesopores larger than 3 nm in functionalized samples which provides low resistance ionic path and in turn improves the access of micropores to the electrolyte. It should be noted that functionalization using the $N_2$ Plasma and $NH_3$ UV due to the lowest ratio of micropores will provide the highest capacitance and well-maintained power density. Thus illustrating the invention's ability to increase the performance of the supercapacitors.

Additional Definitions

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

Reference to "about" a value or parameter herein includes (and describes) variations that are directed to that value or parameter per se. For example, description referring to "about X" includes description of "X". In addition, reference to phrases "less than", "greater than", "at most", "at least", "less than or equal to", "greater than or equal to", or other similar phrases followed by a string of values or parameters is meant to apply the phrase to each value or parameter in the string of values or parameters. For example, a statement that a layer has a thickness of at least about 5 cm, about 10 cm, or about 15 cm is meant to mean that the layer has a thickness of at least about 5 cm, at least about 10 cm, or at least about 15 cm.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein.

What is claimed is:

1. A method of forming carbon nano-onions, comprising:
- adding a carbon material comprising nanodiamond to a vessel; and
- annealing the carbon material in the vessel under vacuum at a pressure of $10^{-2}$-$10^{-7}$ Pa at a temperature of 1500-4000° C. for 1 min to 24 hr.

2. The method of claim 1, further comprising wrapping the carbon material in a graphitic sheet prior to said annealing.

3. The method of claim 2, wherein the graphitic sheet has a thickness of up to 0.25 mm.

4. The method of claim 1, wherein the carbon material comprises nanodiamond, diamondoid, single-crystal diamond, polycrystalline diamond, diamond-like carbon, sintered diamond, amorphous diamond, diamond powder, and doped variants thereof.

5. The method of claim 4, wherein the at least one carbon material is of natural, artificial, or derivative origin.

6. The method of claim 1, wherein the vessel contains at least one inert gas.

7. The method of claim 6, wherein the at least one inert gas comprises nitrogen, carbon dioxide, argon, helium, neon, krypton, xenon, and/or radon.

8. The method of claim 1, wherein the annealing is at a temperature of is 1500-2000° C.

9. The method of claim 1, wherein annealing occurs at an average heating rate of 1° C.-50° C. $min^{-1}$.

10. The method of claim 1, wherein the vessel comprises a vacuum hot press.

11. The method of claim 1, wherein the carbon nano-onions have an average diameter of 5.9 nm to 7.6 nm.

12. A method of forming carbon nano-onions, comprising:

mixing copper chloride hydrate and calcium carbide in a vessel at a mixing ratio of copper chloride hydrate to calcium carbide between 2:1 to 4:1;

annealing the mixture in the vessel at a temperature of 1-1500° C. for 1 min to 24 hr under vacuum at a pressure of $10^{-2}$-$10^{-7}$ Pa to form a product;

cooling the annealed product to ambient temperature; filtering the annealed product with at least one filtering agent;

rinsing the filtered product with at least one rinsing agent; and heating the rinsed product at a temperature of 1-200° C. for 1 min to 24 hr.

13. The method of claim 12, wherein the mixing ratio is between 2.5:1 to 3.5:1.

14. The method of claim 12, wherein the cooling comprises at least one of natural cooling, running coolants, cooling bath, heatsink, and airflow cooling.

15. The method of claim 12, wherein the at least one filtering agent comprises ammonia and carbon tetrachloride.

16. The method of claim 15, wherein a mixing ratio of ammonia to carbon tetrachloride is between 4:1 to 15:1.

17. The method of claim 12, wherein the at least one rinsing agent comprises hydrochloric acid and de-ionized water.

18. The method of claim 17, wherein a mixing ratio of hydrochloric acid to de-ionized water is 1:4.

* * * * *